United States Patent
Dash et al.

(10) Patent No.: US 12,141,366 B2
(45) Date of Patent: Nov. 12, 2024

(54) GESTURE RECOGNITION SYSTEM AND METHOD OF USING SAME

(71) Applicant: MAGIC LEAP, INC., Plantation, FL (US)

(72) Inventors: Denver Halbert Dash, Plantation, FL (US); Emre Tanirgan, Plantation, FL (US)

(73) Assignee: Magic Leap, Inc., Plantation, FL (US)

(*) Notice: Subject to any disclaimer, the term of this patent is extended or adjusted under 35 U.S.C. 154(b) by 0 days.

(21) Appl. No.: 18/150,328

(22) Filed: Jan. 5, 2023

(65) Prior Publication Data
US 2023/0152902 A1 May 18, 2023

Related U.S. Application Data

(63) Continuation of application No. 16/980,263, filed as application No. PCT/US2019/021872 on Mar. 12, 2019, now Pat. No. 11,573,641.

(60) Provisional application No. 62/642,533, filed on Mar. 13, 2018.

(51) Int. Cl.
| | |
|---|---|
| *G06F 3/01* | (2006.01) |
| *G06V 10/34* | (2022.01) |
| *G06V 20/20* | (2022.01) |
| *G06V 40/10* | (2022.01) |
| *G06V 40/20* | (2022.01) |

(52) U.S. Cl.
CPC .............. *G06F 3/017* (2013.01); *G06F 3/011* (2013.01); *G06V 10/34* (2022.01); *G06V 20/20* (2022.01); *G06V 40/113* (2022.01); *G06V 40/28* (2022.01)

(58) Field of Classification Search
None
See application file for complete search history.

(56) References Cited

U.S. PATENT DOCUMENTS

| | | | |
|---|---|---|---|
| 8,836,768 B1 * | 9/2014 | Rafii | G02B 27/017 348/47 |
| 9,207,773 B1 | 12/2015 | Rafii | |
| 2005/0151850 A1 * | 7/2005 | Ahn | G06F 3/0304 348/E5.029 |
| 2012/0314031 A1 * | 12/2012 | Shotton | H04N 13/204 348/46 |
| 2015/0153835 A1 | 6/2015 | Perez et al. | |
| 2015/0234477 A1 | 8/2015 | Abovitz et al. | |

(Continued)

FOREIGN PATENT DOCUMENTS

| | | | | |
|---|---|---|---|---|
| WO | WO2013071198 | * | 5/2013 | ............ G06F 3/041 |
| WO | WO 2013071198 A2 | | 5/2013 | |

OTHER PUBLICATIONS

Amendment Response to NFOA for U.S. Appl. No. 16/980,263 dated Aug. 1, 2022.

(Continued)

*Primary Examiner* — Matthew Yeung
(74) *Attorney, Agent, or Firm* — Vista IP Law Group, LLP

(57) ABSTRACT

A method of executing a gesture command includes identifying a hand centroid of a hand. The method also includes identifying a first finger tip of a first finger on the hand. The method further includes identifying a thumb tip of a thumb on the hand. Moreover, the method includes determining a surface normal relationship between the hand centroid, the first fingertip and the thumb tip.

10 Claims, 27 Drawing Sheets

(56) References Cited

U.S. PATENT DOCUMENTS

2016/0004908 A1* 1/2016 Lundberg ............... G06F 3/011
                                                   382/103
2019/0180473 A1* 6/2019 Guleryuz ............. G06F 3/0304

OTHER PUBLICATIONS

Amendment Response to NFOA for U.S. Appl. No. 16/980,263 dated Oct. 8, 2021.
Final Office Action for U.S. Appl. No. 16/980,263 dated Dec. 15, 2021.
Non-Final Office Action for U.S. Appl. No. 16/980,263 dated May 2, 2022.
Non-Final Office Action for U.S. Appl. No. 16/980,263 dated Jul. 8, 2021.
Amendment Response to FOA for U.S. Appl. No. 16/980,263 dated Mar. 15, 2022.
Notice of Allowance for U.S. Appl. No. 16/980,263 dated Oct. 5, 2022.
PCT International Preliminary Report on Patentability for International Patent Appln. No. PCT/US2019/021872, Applicant Magic Leap, Inc., dated Sep. 24, 2020.
PCT International Search Report and Written Opinion for International Appln. No. PCT/US2019/021872, Applicant Magic Leap, Inc., forms PCT/ISA/210, 220, and 237, dated Jul. 17, 2019 (9 pages).

* cited by examiner

GESTURE RECOGNITION SYSTEM AND METHOD OF USING SAME

CROSS-REFERENCE TO RELATED APPLICATIONS

The present disclosure is a continuation of U.S. patent application Ser. No. 16/980,263, filed Sep. 11, 2020, entitled "Gesture Recognition System and Method of Using Same," which claims priority to PCT Application No. PCT/US2019/021872, filed on Mar. 12, 2019, entitled "Gesture Recognition System and Method of Using Same," which claims priority to U.S. Provisional Patent Application No. 62/642,533, filed on Mar. 13, 2018, entitled "Gesture Recognition System and Method of Using Same." The contents of the aforementioned patent applications are hereby expressly and fully incorporated by reference in their entirety, as though set forth in full.

FIELD OF THE INVENTION

The present disclosure relates to mixed reality systems including gesture recognition systems, and methods for using same.

BACKGROUND

Modern computing and display technologies have facilitated the development of "mixed reality" or "MR" systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to actual real-world visual input. An augmented reality, or "AR", scenario typically involves presentation of digital or virtual image information as an augmentation to visualization of the actual world around the user (i.e., transparency to other actual real-world visual input). Accordingly, AR scenarios involve presentation of digital or virtual image information with transparency to other actual real-world visual input.

Various optical systems generate images at various depths for displaying mixed reality (VR and AR) scenarios. Some such optical systems are described in U.S. U.S. Utility patent application Ser. No. 14/555,585 filed on Nov. 27, 2014, the contents of which are hereby expressly and fully incorporated by reference in their entirety, as though set forth in full.

Mixed reality systems typically employ wearable display devices (e.g., head-worn displays, helmet-mounted displays, or smart glasses) that are at least loosely coupled to a user's head, and thus move when the user's head moves. If the user's head motions are detected by the display system, the data being displayed can be updated to take the change in head pose (i.e., the orientation and/or location of user's head) into account.

As an example, if a user wearing a head-worn display views a virtual representation of a three-dimensional (3-D) object on the display and walks around the area where the 3-D object appears, that 3-D object can be re-rendered for each viewpoint, giving the user the perception that he or she is walking around an object that occupies real space. If the head-worn display is used to present multiple objects within a virtual space (for instance, a rich virtual world), measurements of head pose can be used to re-render the scene to match the user's dynamically changing head location and orientation and provide an increased sense of immersion in the virtual space. However, there is an inevitable lag between rendering a scene and displaying/projecting the rendered scene.

Head-worn displays that enable AR provide concurrent viewing of both real and virtual objects. With an "optical see-through" display, the user can see through transparent (or semi-transparent) elements in the display system to view directly the light from real objects in the environment. The transparent element, often referred to as a "combiner," superimposes light from the display over the user's view of the real world, where light produced by the display projects an image of the virtual content over the see-through view of the real world. A camera (e.g., a field of view or FOV camera) may be mounted onto the wearable display to capture images or videos of the scene being viewed by the user.

Current 3-D optical systems, such as those in mixed reality systems, optically render virtual objects. Objects are "virtual" in that they are not real physical objects located in respective positions in 3-D space. Instead, virtual objects only exist in the brains (e.g., the optical centers) of viewers and/or listeners when stimulated by light beams directed to the eyes of audience members.

MR systems allow virtual objects to interact with real world physical objects. Some of these interactions make use of user input. Mixed reality systems can receive user input through gesture recognition sub-systems, thereby eliminating separate input devices (e.g., keyboards, mice, joysticks, totems, etc.) from the mixed reality systems. Examples of such gesture recognition system are described in U.S. U.S. Utility patent application Ser. No. 14/331,218 filed on Jul. 14, 2014, the contents of which are hereby expressly and fully incorporated by reference in their entirety, as though set forth in full. In such systems, a user's hands function as the input devices. However, the complexity of the human hand and it's wide range of articulation complicates gesture recognition. There exists a need for more accurate and precise/repeatable gesture recognition and systems for accomplishing same.

SUMMARY

In one embodiment, a method of executing a gesture command includes identifying a hand centroid of a hand. The method also includes identifying a first finger tip of a first finger on the hand. The method further includes identifying a thumb tip of a thumb on the hand. Moreover, the method includes determining a surface normal relationship between the hand centroid, the first fingertip, and the thumb tip.

In one or more embodiments, the surface normal relationship includes respective surface normals at the hand centroid on a caudal surface of the hand, at the first fingertip, and at the thumb tip are substantially parallel. A virtual cursor may be displayed in a field of view at a location corresponding to the first fingertip. The method may also include detecting a movement of the thumb tip to a mapped planar position between the hand centroid and the first fingertip, and executing a command at the cursor location in response to detecting the movement.

In one or more embodiments, the surface normal relationship includes a surface normal at the hand centroid on a caudal surface of the hand is substantially orthogonal to the respective surface normals at the first fingertip and at the thumb tip. A virtual cursor may be displayed in a field of view at a location between the first fingertip and the thumb tip. The method of may also include detecting that a first fingertip position of the first fingertip and a thumb tip position of the thumb tip are substantially similar, and executing a command at the cursor location in response to detecting of the substantially similar first fingertip and thumb tip positions.

In one or more embodiments, the hand centroid, the first fingertip, and the thumb tip are outside of a field of view of a user. In other embodiments, the hand centroid, the first fingertip, and the thumb tip may be inside of a field of view of a camera worn by the user.

In another embodiment, a method of executing a gesture command includes identifying a hand centroid of a hand. The method also includes identifying a first finger tip of a first finger on the hand. The method further includes identifying a thumb tip of a thumb on the hand. Moreover, the method includes calculating a first line between the first fingertip and the hand centroid. In addition, the method includes calculating a second line between the thumb tip and the hand centroid. The method also includes determining an angular relationship between the first and second lines.

In one or more embodiments, the angular relationship is that the first and second lines are substantially orthogonal. A virtual cursor may displayed in a field of view at a location corresponding to the first fingertip. The method may also include detecting a change in the angular relationship between the first and second lines, and executing a command at the cursor location in response to detecting the change in the angular relationship. The change in the angular relationship may be a threshold amount of decrease in an angle between first and second lines. The threshold amount of decrease may be about 30 degrees.

Additional and other objects, features, and advantages of the invention are described in the detail description, figures and claims.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are directed to systems, methods, and articles of manufacture for recognizing gestures in a single embodiment or in multiple embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The gesture recognition systems may be implemented independently of mixed reality systems, but some embodiments below are described in relation to MR/AR systems for illustrative purposes only. Further, the gesture recognition systems described herein may also be used in an identical manner with VR systems.

Illustrative Mixed Reality Scenario and System

The description that follows pertains to an illustrative augmented reality system with which the gesture recognition system may be practiced. However, it is to be understood that the embodiments also lends themselves to applications in other types of display systems (including other types of mixed reality systems), and therefore the embodiments are not to be limited to only the illustrative system disclosed herein.

Figure 1:
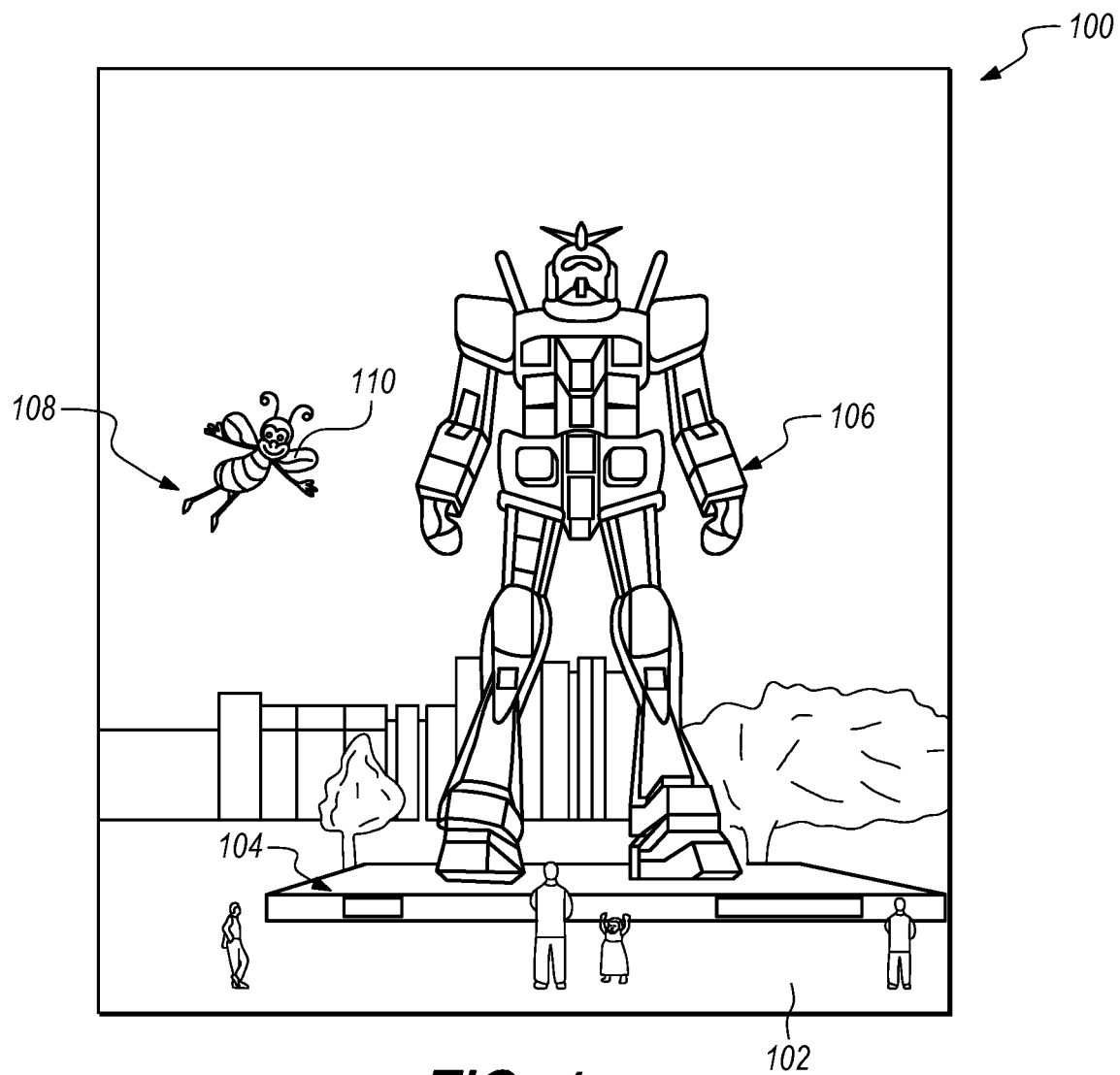
FIG. 1 depicts a user's view of augmented reality (AR) through a wearable AR user device according to one embodiment.

Mixed reality (e.g., AR) scenarios often include presentation of virtual content (e.g., images and sound) corresponding to virtual objects in relationship to real-world objects. For example, referring to FIG. 1, an augmented reality scene 100 is depicted wherein a user of an AR technology sees a real-world, physical, park-like setting 102 featuring people, trees, buildings in the background, and a real-world, physical concrete platform 104. In addition to these items, the user of the AR technology also perceives that he "sees" a virtual robot statue 106 standing upon the real-world, physical platform 104, and a virtual cartoon-like avatar character 108 flying by which seems to be a personification of a bumblebee, even though these virtual objects 106, 108 do not exist in the real world.

Like AR scenarios, VR scenarios can also receive user input from gestures to allow interaction with virtual/digital objects in the scenarios. Accurately recognizing user gestures can improve the AR/VR scenarios.

The description that follows pertains to an illustrative augmented reality system with which the invention may be practiced. However, it is to be understood that the invention also lends itself to applications in other types of augmented reality and virtual reality systems, and therefore the invention is not to be limited to only the illustrative system disclosed herein.

Figure 2:
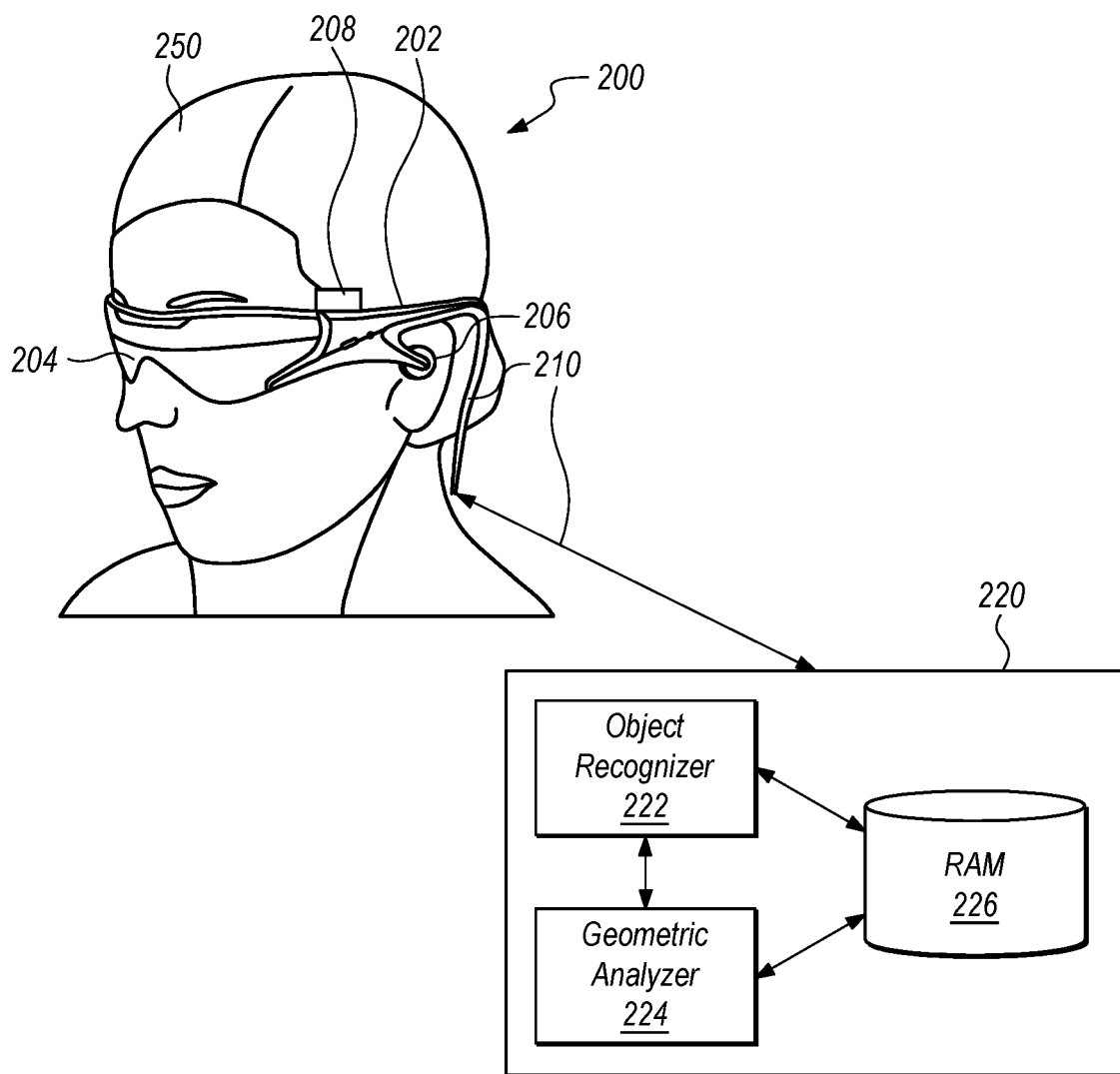
FIG. 2 depicts an AR system including a gesture recognition system according to one embodiment.

Referring to FIG. 2, one embodiment of an augmented reality system 200 constructed in accordance with present embodiments will now be described. The augmented reality system 200 may include one or more at least partially transparent surfaces through which the ambient environment can be seen and through which the augmented reality system 200 produces images of virtual objects (e.g., using one or more light projectors).

The augmented reality system 200 includes a frame structure 202 worn by a user 250, a display system 204 carried by the frame structure 202, such that the display system 204 is positioned in front of the eyes of the user 250, and a speaker 206 and a FOV camera 208 incorporated into or connected to the frame structure 202. In the illustrated embodiment, the speaker 206 is carried by the frame structure 202, such that the speaker 206 is positioned adjacent (in or around) the ear canal of the user 250, e.g., an earbud or headphone. In the illustrated embodiment, the FOV camera 208 is carried by the frame structure 202, such that the FOV camera 208 is forward facing and adjacent the user's eyes. The augmented reality system 200 may be operated in conjunction with a gesture recognition subsystem 220, and operatively coupled by a wired or wireless connection 210 thereto.

The gesture recognition subsystem 220 includes an object recognizer 222, a geometric analyzer 224, and a memory ("RAM") 226. The object recognizer 222 is configured to process image data and identify objects therein. The geometric analyzer 224 is configured to process object data and identify geometric characteristics thereof. The identified objects and corresponding geometric characteristics can be stored in the RAM 226.

The forward facing FOV camera 208 may be employed for any number of purposes, such as recording of images/video from the forward direction of the system 200. In addition, the FOV cameras 208 may be used to capture information about the environment in which the user 250 is located, such as information indicative of distance, orientation, and/or angular position of the user 250 with respect to that environment and specific objects in that environment. The FOV cameras 208 may also be used to capture information about the user's hands. That information may be analyzed by the gesture recognition subsystem 220 to attempt to recognize a gesture for user input.

The augmented reality system 200 may further include one or more sensors mounted to the frame structure 202 for detecting the position (including orientation) and movement of the head of the user 250 and/or the eye position and inter-ocular distance of the user 250. Such sensor(s) may include image capture devices, microphones, inertial measurement units (IMUs), accelerometers, compasses, GPS units, radio devices, and/or gyros. For example, in one embodiment, the augmented reality system 200 comprises a head worn transducer subsystem that includes one or more inertial transducers to capture inertial measures indicative of movement of the head of the user 250. Such devices may be used to sense, measure, or collect information about the head movements of the user 250. For instance, these devices may be used to detect/measure movements, speeds, acceleration and/or positions of the head of the user 250. The position (including orientation) of the head of the user 250 is also known as the user 250 "head pose."

The augmented reality system 200 may further include rearward facing cameras to track angular position (the direction in which the eye or eyes are pointing), blinking, and depth of focus (by detecting eye convergence) of the eyes of the user 250. Such eye tracking information may, for example, be discerned by projecting light at the end user's eyes, and detecting the return or reflection of at least some of that projected light.

The augmented reality system 200 further comprises a control subsystem (not shown) that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs). The control subsystem may be separate from the gesture recognition subsystem 220 or may include the gesture recognition subsystem 220.

The various processing components of the augmented reality system 200 may be physically contained in a distributed subsystem. For example, the augmented reality system 200 comprises a local processing and data module operatively coupled, such as by a wired lead or wireless connectivity 210, to a portion of the display subsystem 204. The local processing and data module may be mounted in a variety of configurations, such as fixedly attached to the frame structure 202, fixedly attached to a helmet or hat, embedded in headphones, removably attached to the torso of the user 250, or removably attached to the hip of the user 250 in a belt-coupling style configuration. The augmented reality system 200 may further include a remote processing module and remote data repository operatively coupled, such as by a wired lead or wireless connectivity to the local processing and data module, such that these remote modules are operatively coupled to each other and available as resources to the local processing and data module. The local processing and data module may comprise a power-efficient processor or controller, as well as digital memory, such as flash memory, both of which may be utilized to assist in the processing, caching, and storage of data captured from the sensors and/or acquired and/or processed using the remote processing module and/or remote data repository, possibly for passage to the display subsystem 204 after such processing or retrieval. The remote processing module may comprise one or more relatively powerful processors or controllers configured to analyze and process data and/or image information. The remote data repository may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules. The couplings between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless, with the exception of the optical fiber(s).

Summary of Problems and Solutions

The inaccuracy and lack of repeatability in current gesture recognition systems can result in user input errors that can frustrate users. The embodiments described herein identify the centroid and various surface normals of a user's hand. By comparing these geometric characteristics of a user's hand, the embodiments described herein more accurately recognize user gestures, therein improving user input.

Gesture Recognition Systems and Methods

In some implementations, the AR system may detect and be responsive to one or more finger/hand gestures. These gestures can take a variety of forms and may, for example, be based on inter-finger interaction, pointing, tapping, rubbing, etc. Other gestures may, for example, include 2D or 3D representations of characters (e.g., letters, digits, punctuation). To enter such, a user swipes their finger in the defined character pattern. Other gestures may include thumb/wheel selection type gestures, which may, for example be used with a "popup" circular radial menu which may be rendered in a field of view of a user, according to one illustrated embodiment.

Embodiments of the AR system can therefore recognize various commands using gestures, and in response perform certain functions mapped to the commands. The mapping of gestures to commands may be universally defined, across many users, facilitating development of various applications which employ at least some commonality in user interface. Alternatively or additionally, users or developers may define a mapping between at least some of the gestures and corresponding commands to be executed by the AR system in response to detection of the commands.

For example, a pointed index finger may indicate a command to focus, for example to focus on a particular portion of a scene or virtual content at which the index finger is pointed. A pinch gesture can be made with the tip of the index finger touching a tip of the thumb to form a closed circle, e.g., to indicate a grab and/or copy command. Another example pinch gesture can be made with the tip of the ring finger touching a tip of the thumb to form a closed circle, e.g., to indicate a select command.

Yet another example pinch gesture can be made with the tip of the pinkie finger touching a tip of the thumb to form a closed circle, e.g., to indicate a back and/or cancel command. A gesture in which the ring and middle fingers are curled with the tip of the ring finger touching a tip of the thumb may indicate, for example, a click and/or menu command. Touching the tip of the index finger to a location on the head worn component or frame may indicate a return to home command.

Figure 3:
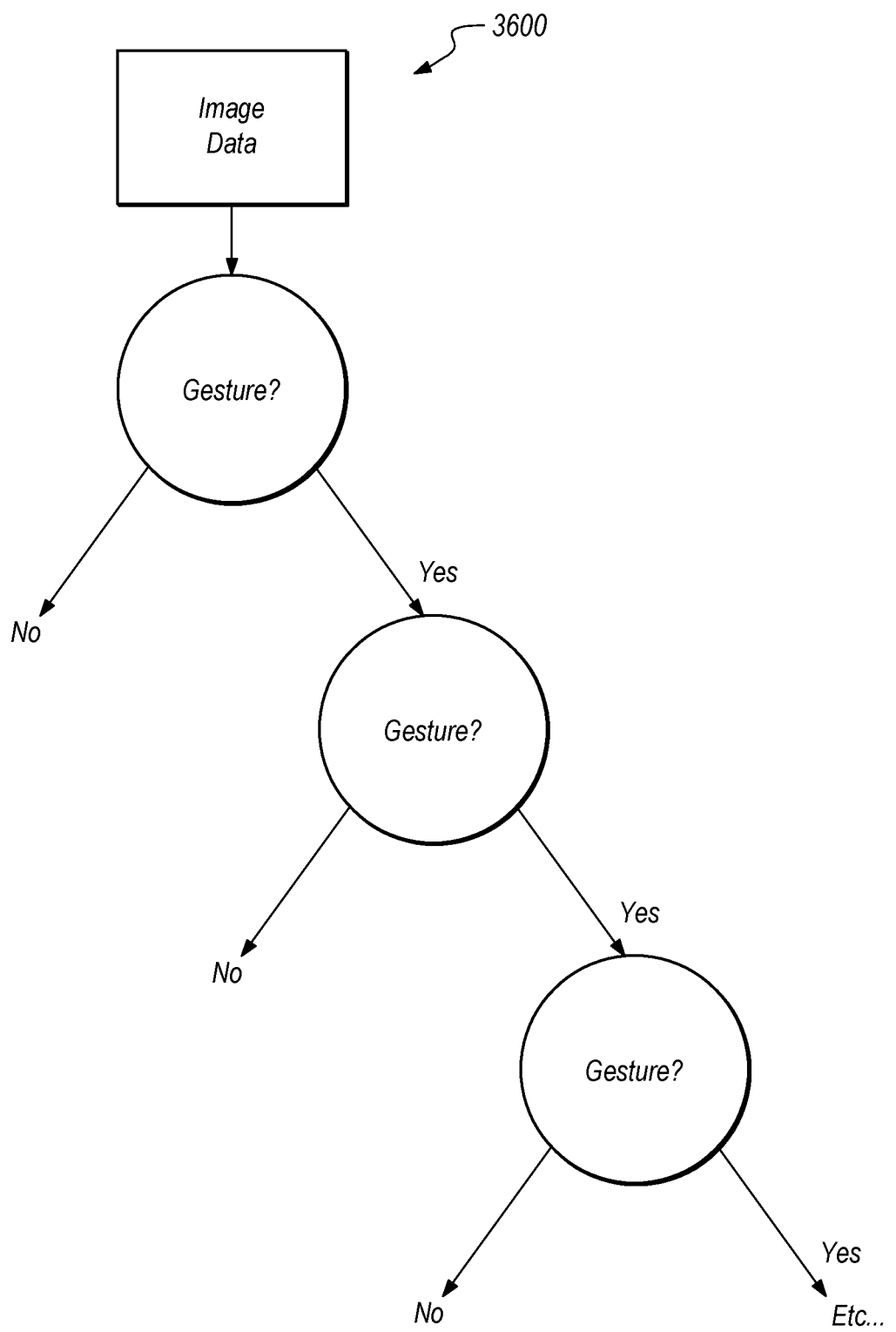
FIGS. 3-11 are schematic diagrams illustrating gesture recognition according to various embodiments.

Embodiments of the invention provide an advanced system and method for performing gesture tracking and identification. In one embodiment, a rejection cascade approach is performed, where multiple stages of gesture analysis is performed upon image data to identify gestures. As shown in the cascade 3600 of FIG. 3, incoming images (e.g., an RGB image at a depth D) is processed using a series of permissive analysis nodes. Each analysis node performs a distinct step of determining whether the image is identifiable as a gesture. Each stage in this process (i.e., analysis node) performs a targeted computation so that the sequence of stages/analysis nodes can be used to efficiently perform the gesture processing. This means, for example, that the amount of processing power at each stage of the process, along with the sequence/order of the nodes, can be used to optimize the ability to remove non-gestures while doing so with minimal computational expenses. For example, computationally less-expensive algorithms may be applied in the earlier stages to remove large numbers of "easier" candidates, thereby leaving smaller numbers of "harder" data to be analyzed in later stages using more computationally expensive algorithms.

Figure 4:
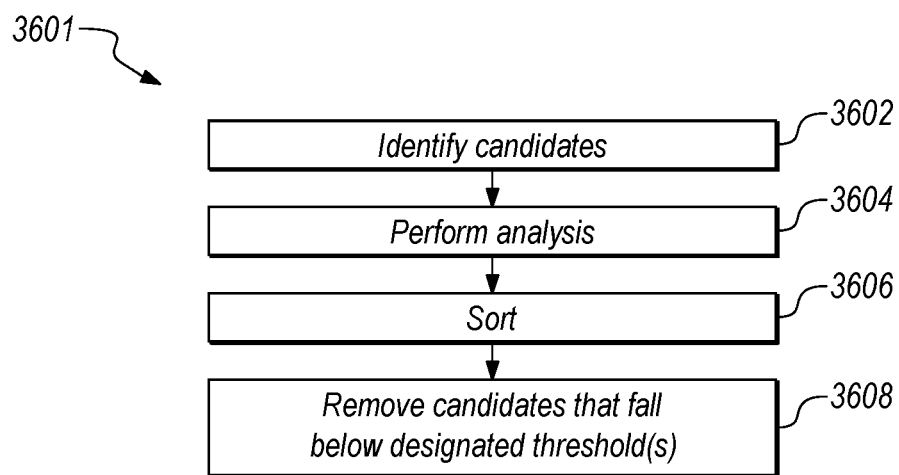

The general approach to perform this type of processing in one embodiment is shown in the flowchart 3601 of FIG. 4. The first step is to generate candidates for the gesture processing (step 3602). These include, for example, images captured from sensor measurements of the wearable device, e.g., from camera(s) mounted on the wearable device. Next, analysis is performed on the candidates to generate analysis data (step 3604). For example, one type of analysis may be to check on whether the contour of the shapes (e.g., fingers) in the image is sharp enough. Sorting is then performed on the analyzed candidates (step 3606). Finally, any candidate that corresponds to a scoring/analysis value that is lower than a minimum threshold is removed from consideration (step 3608).

Figure 5:
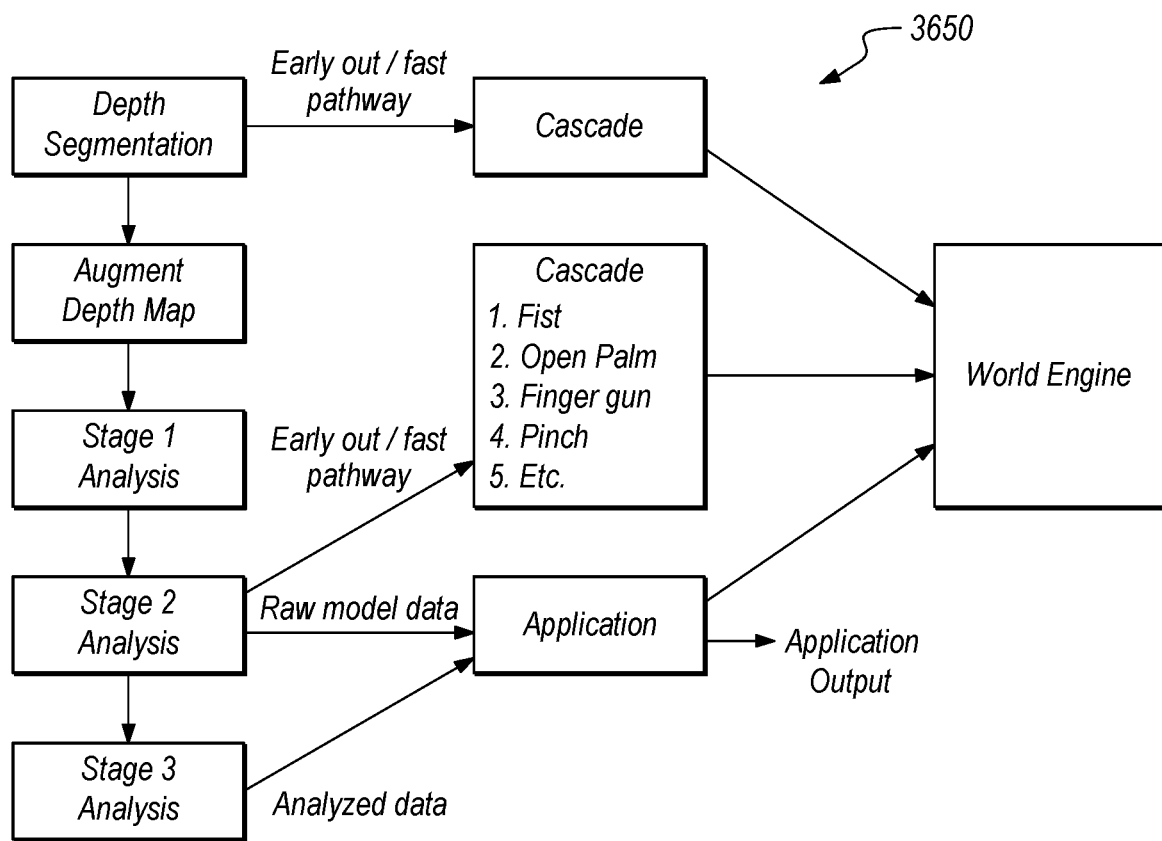
Figure 6:
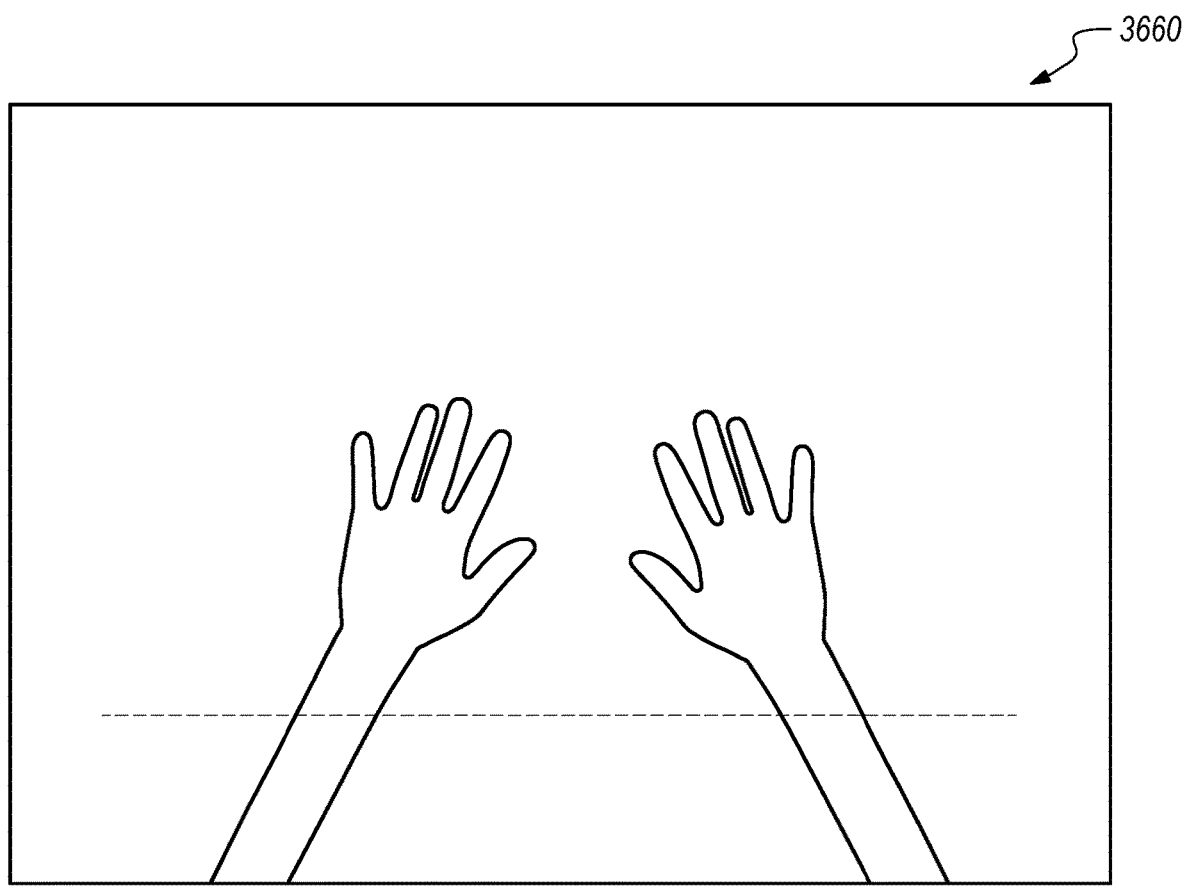

FIG. 5 depicts a more detailed approach 3650 for gesture analysis according to one embodiment of the invention. The first action is to perform depth segmentation upon the input data. For example, typically the camera providing the data inputs (e.g., the camera producing RGB+depth data) will be mounted on the user's head, where the camera FOV (field of view) will cover the range in which the human could reasonably perform gestures. As shown in illustration 3660 of FIG. 6, a line search can be performed through the data (e.g., from the bottom of the FOV).

If there are identifiable points along that line, then potentially a gesture has been identified. Performing this analysis over a series of lines can be used to generate the depth data. In some embodiment, this type of processing can be quite sparse—perhaps where 50 points are acquired relatively really quickly. Of course, different kinds of line series can be employed, e.g., in addition to or instead of flat lines across the bottom, smaller diagonal lines are employed in the area where there might be a hand/arm.

Any suitable pattern may be employed, selecting ones that are most effective at detecting gestures. In some embodiments, a confidence-enhanced depth map is obtained, where the data is flood filled from cascade processing where a "flood fill" is performed to check for and filter whether the identified object is really a hand/arm. The confidence enhancement can be performed, for example, by getting a clear map of the hand and then checking for the amount of light that is reflected off the hand in the images to the sensor, where the greater amount of light corresponds to a higher confidence level to enhance the map.

From the depth data, one can cascade to perform immediate/fast processing, e.g., where the image data is amenable to very fast recognition of a gesture. This works best for very simple gestures and/or hand/finger positions.

In many cases, deeper processing is to be performed to augment the depth map. For example, one type of depth augmentation is to perform depth transforms upon the data. Another type of augmentation is to check for geodesic distances from specified point sets, such as boundaries, centroids, etc. For example, from a surface location, a determination is made of the distance to various points on the map. This attempts to find, for example, the farthest point to the tip of the fingers (by finding the end of the fingers). The point sets may be from the boundaries (e.g., outline of hand) or centroid (e.g., statistical central mass location).

Figure 7:
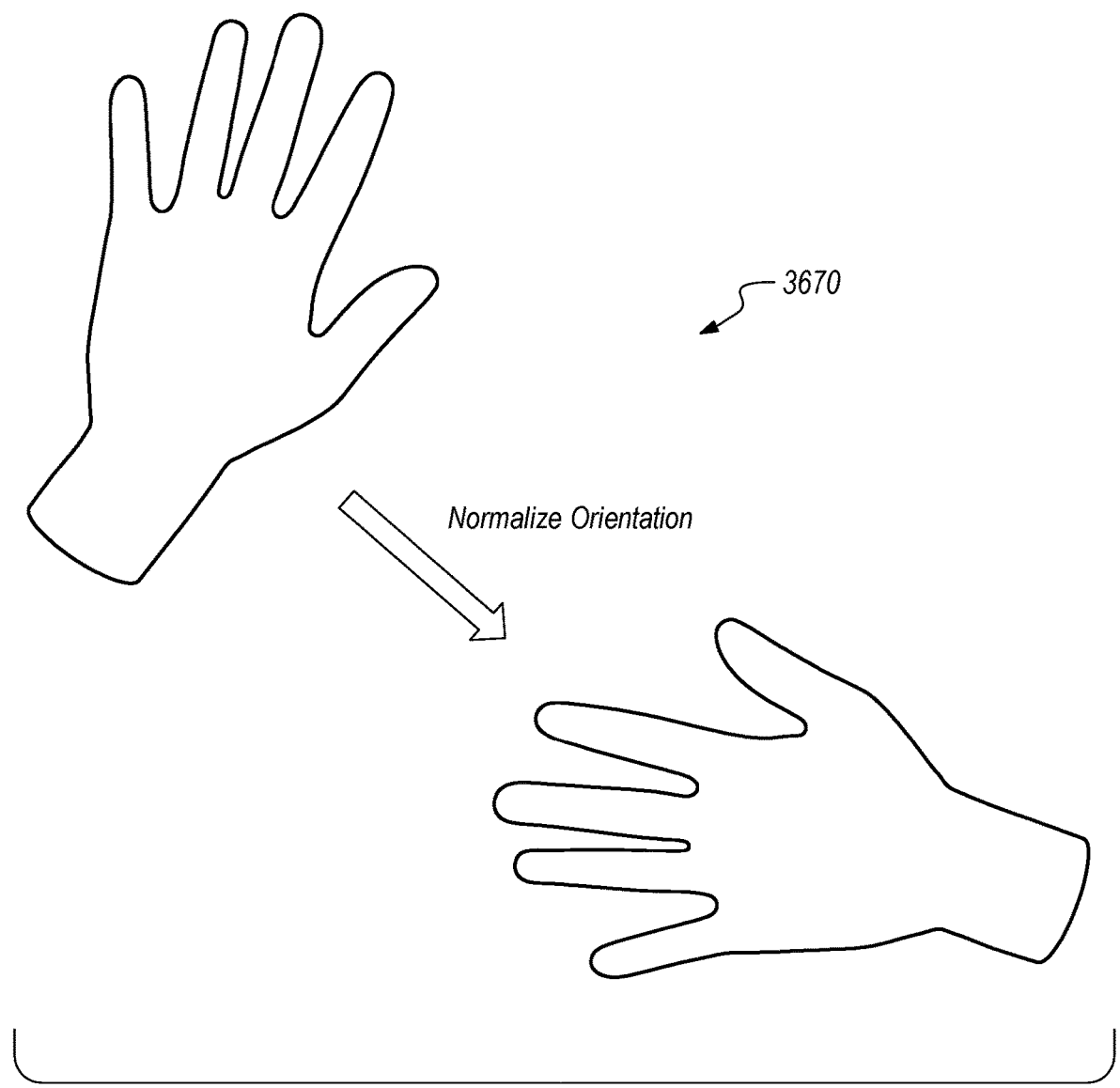

Surface normalization may also be calculated. In addition, curvatures may also be estimated, which identifies how fast a contour turns—and to perform a filtering process to go over the points and removing concave points from fingers. In some embodiments, orientation normalization may be performed on the data. To explain, consider that a given image of the hand may be captured with the hand in different positions. However, the analysis may be expecting a canonical position of the image data of the hand. In this situation, as shown in illustration 3670 of FIG. 7, the mapped data may be re-oriented to change to a normalized/canonical hand position.

Figure 8:
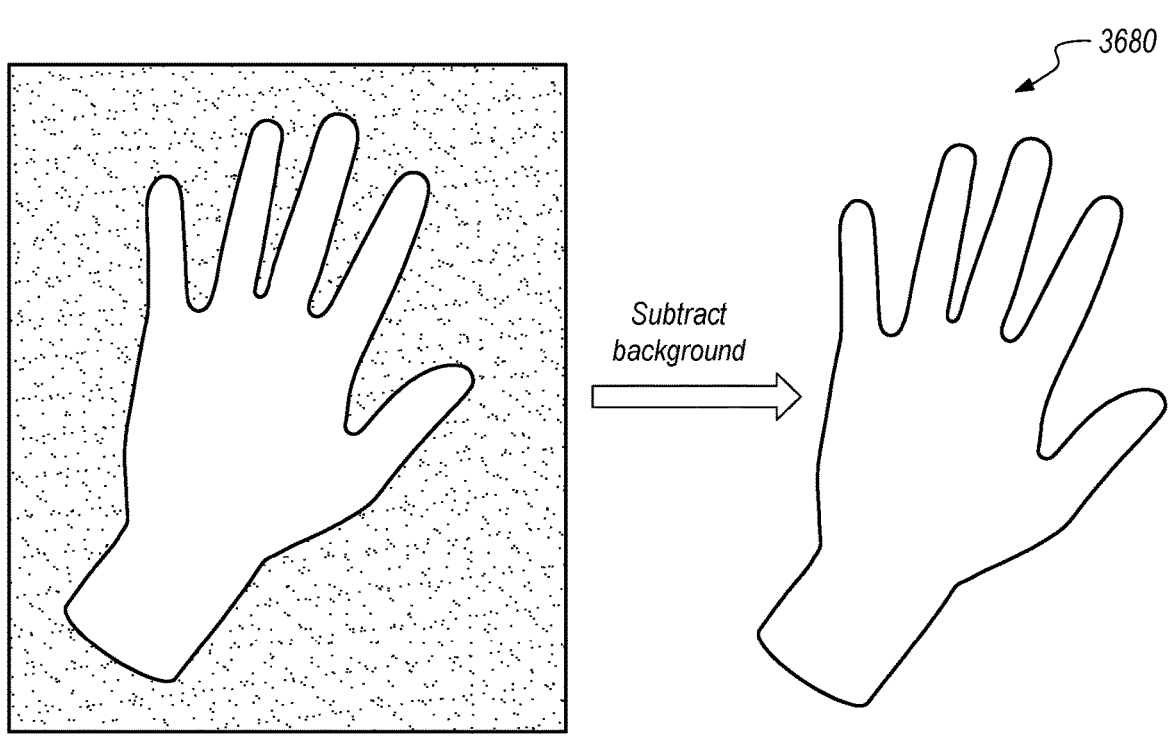

One advantageous approach in some embodiments of invention is to perform background subtraction on the data. In many cases, a known background exists in a scene, e.g., the pattern of a background wall. In this situation, the map of the object to be analyzed can be enhanced by removing the background image data. An example of this process is shown in illustration 3680 of FIG. 8, where the left portion of the figure shows an image of a hand over some background image data. The right-hand portion of the figure shows the results of removing the background from the image, leaving the augmented hand data with increased clarity and focus.

Figure 9:
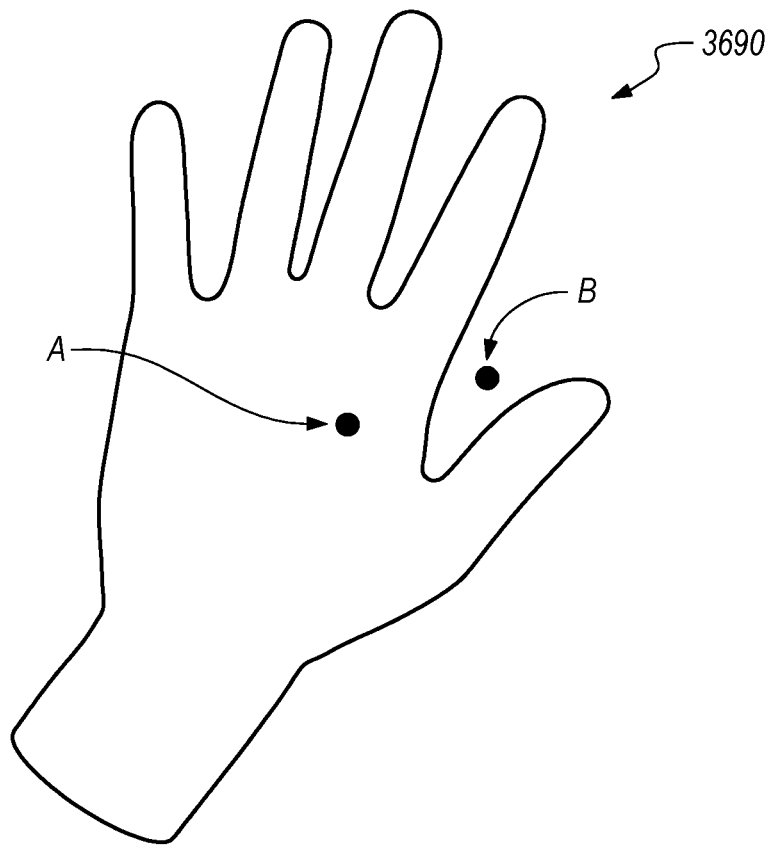

Depth comparisons may also be performed upon points in the image to identify the specific points that pertain to the hand (as opposed to the background non-hand data). For example, as shown in illustration 3690 of FIG. 9, it can be seen a first point A is located at a first depth and a second point B is located at a significantly different second depth. In this situation, the difference in the depths of these two points makes it very evident that they likely belong to different objects. Therefore, if one knows that the depth of the hand is at the same depth value as point A, then one can conclude that point A is part of the hand. On the other hand, since the depth value for point B is not the same as the depth of the hand, then one can readily conclude that point B is not part of the hand.

At this point a series of analysis stages is performed upon the depth map. Any number of analysis stages can be applied to the data. The present embodiment shows three stages, but one of ordinary skill in the art would readily understand that any other number of stages (either smaller or larger) may be used as appropriate for the application to which the invention is applied.

In the current embodiment, stage 1 analysis is performed using a classifier mechanism upon the data. For example, a classification/decision forest can be used to apply a series of yes/no decisions in the analysis to identify the different parts of the hand for the different points in the mapping.

This identifies, for example, whether a particular point belongs to the palm portion, back of hand, non-thumb finger, thumb, fingertip, and/or finger joint. Any suitable classifier can be used for this analysis stage. For example, a deep learning module or a neural network mechanism can be used instead of or in addition to the classification forest. In addition, a regression forest (e.g., using a Hough transformation) can be used in addition to the classification forest.

Figure 10:
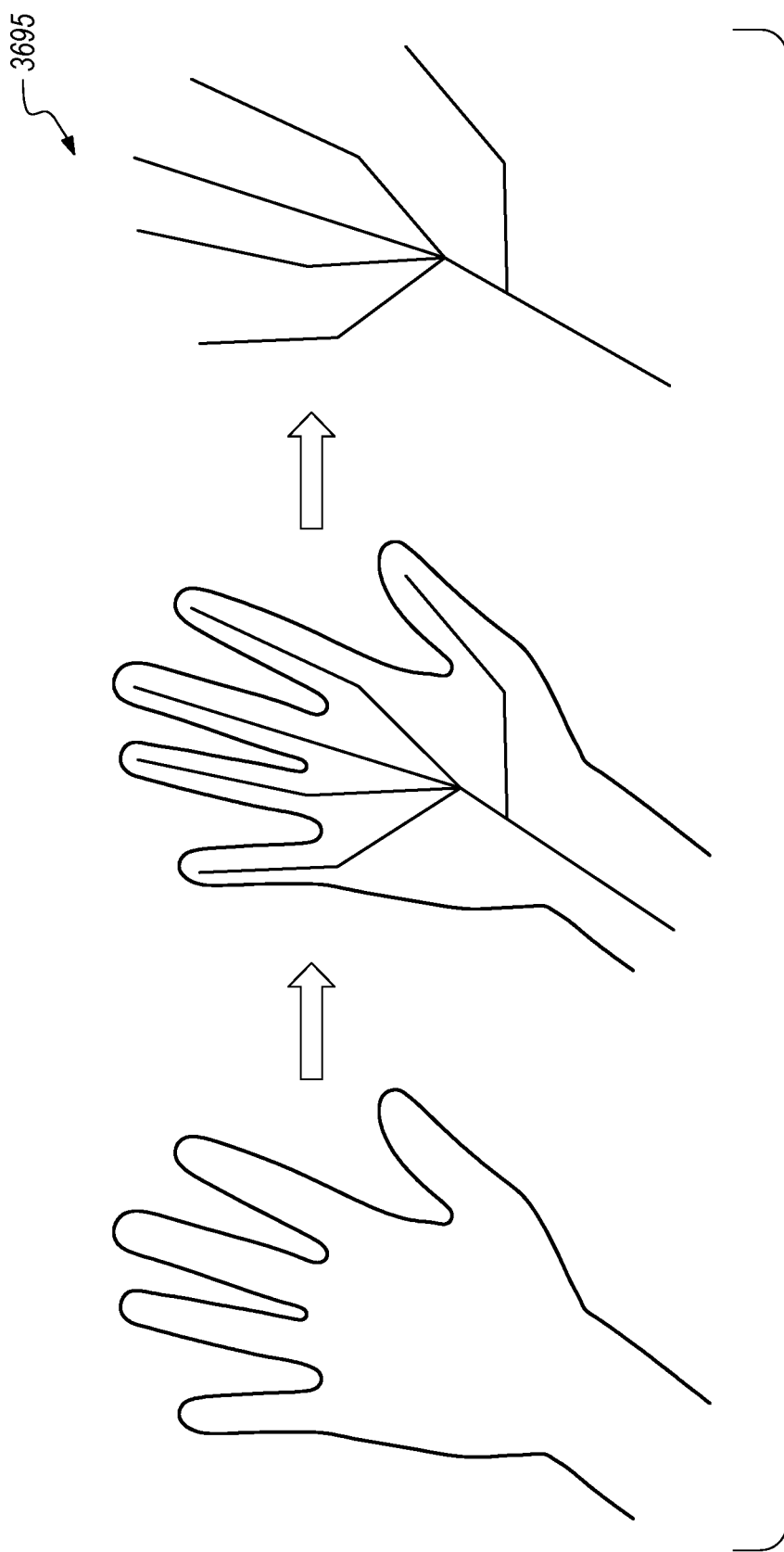

The next stage of analysis (stage 2) can be used to further analysis the mapping data. For example, analysis can be performed to identify joint locations, articular, or to perform skeletonization on the data. Illustration 3695 of FIG. 10 provides an illustration of skeletonization, where an original map of the hand data is used to identify the locations of bones/joints within the hand, resulting in a type of "stick" figure model of the hand/hand skeleton. This type of model provides with clarity a very distinct view of the location of the fingers and the specific orientation and/or configuration of the hand components. Labelling may also be applied at this stage to the different parts of the hand.

Figure 11:
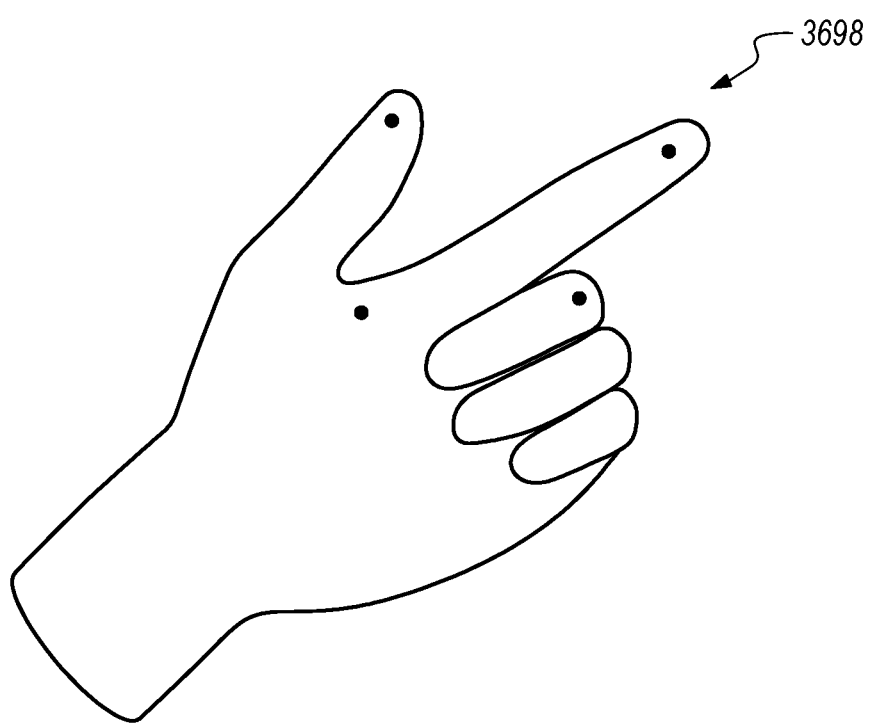

At this point, it is possible that the data is now directly consumable by a downstream application without requiring any further analysis. This may occur, for example, if the downstream application itself includes logic to perform additional analysis/computations upon the model data. In addition, the system can also optionally cascade to perform immediate/fast processing, e.g., where the data is amenable to very fast recognition of a gesture, such as the (1) first gesture; (2) open palm gesture; (3) finger gun gesture; (4) pinch; (5) etc. This processing may include using a neural network with buckets with confidence values. For example, as shown in illustration 3698 of FIG. 11, various points on the hand mapping (e.g., point on extended thumb and point on extended first finger) can be used to immediately identify a pointing gesture. The outputs will then proceed to a world engine, e.g., to take action upon a recognized gesture.

In addition, deeper processing can be performed in the stage 3 analysis. This may involve, for example, using a decision forest/tree to classify the gesture. This additional processing can be used to identify the gesture, determine a hand pose, identify context dependencies, and/or any other information as needed.

Prior/control information can be applied in any of the described steps to optimize processing. This permits some biasing for the analysis actions taken in that stage of processing. For example, for game processing, previous action taken in the game can be used to bias the analysis based upon earlier hand positions/poses. In addition, a confusion matrix can be used to more accurately perform the analysis.

Figure 12:
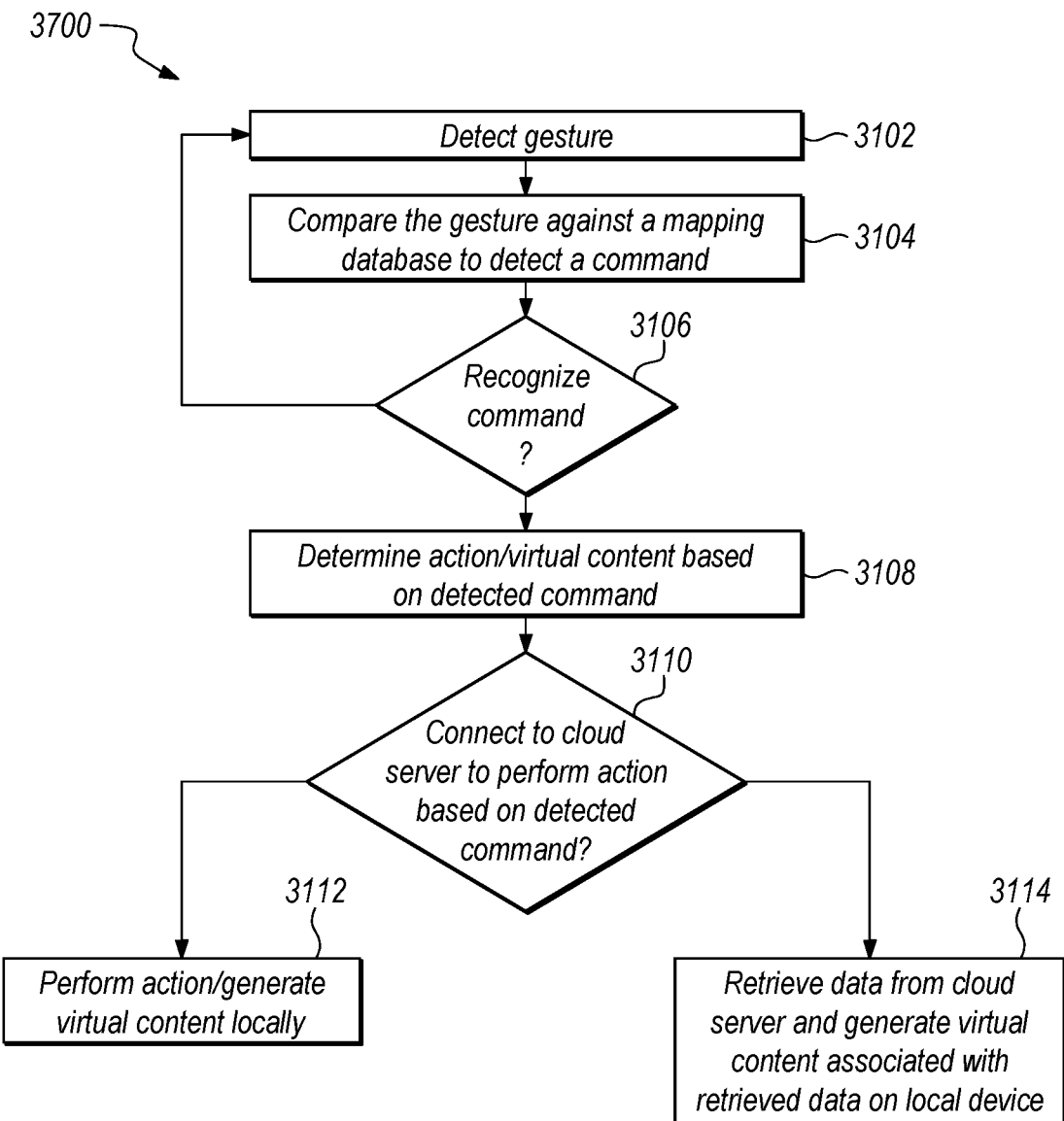
FIG. 12 is a process flow diagram of an exemplary method of performing an action based on a recognized gesture according to one embodiment.

Using the principles of gesture recognition discussed above, the AR system may use visual input gathered from the user's FOV cameras and recognize various gestures that may be associated with a predetermined command or action. Referring now to flowchart 3700 of FIG. 12, in step 3102, the AR system may detect a gesture as discussed in detail above. In some embodiments, the AR system may detect one or more gestures, for example, a series of gestures.

As described above, the movement of the fingers (e.g., one or more gestures) may be compared to a database to detect a predetermined command, in step 3104. The AR system recognizes a command in step 3106. If the one or more gestures do correspond to any known command, the AR system determines the desired action and/or desired virtual content based on the one or more gestures, in step 3108. If the one or more gestures do not correspond to any known command, the AR system simply goes back to detecting other gestures or movements to step 3102.

In step 3108, the AR system determines the type of action necessary in order to satisfy the command. For example, the user may want to switch an application, or may want to turn a page, may want to generate a user interface, may want to connect to a friend located at another physical location, etc. Based on the desired action/virtual content, the AR system determines whether to retrieve information from the cloud servers, or whether the action can be performed using local resources on the user device, in step 3110.

For example, if the user simply wants to turn a page of a virtual book, the required data may already have been downloaded or may reside entirely on the local device, in which case, the AR system simply retrieves data associated with the next page and may display the next page to the user. Similarly, if the user wants to create a user interface such that the user can draw a picture in the middle of space, the AR system may simply generate a virtual drawing surface in the desired location without needing data from the cloud.

Data associated with many applications and capabilities may be stored on the local device such that the user device does not need to unnecessarily connect to the cloud or access the passable world model. Thus, if the desired action can be performed locally, local data may be used to display virtual content corresponding to the detected gesture (step 3112).

Alternatively, in step 3114, if the system needs to retrieve data from the cloud or the passable world model, the system may send a request to the cloud network, retrieve the appropriate data and send it back to the local device such that the action or virtual content may be appropriately displayed to the user. For example, if the user wants to connect to a friend at another physical location, the AR system may need to access the passable world model to retrieve the necessary data associated with the physical form of the friend in order to render it accordingly at the local user device.

Thus, based on the user's interaction with the AR system, the AR system may create many types of user interfaces as desired by the user. The following represent some exemplary embodiments of user interfaces that may be created in a similar fashion to the exemplary process described above.

It should be appreciated that the above process is simplified for illustrative purposes, and other embodiments may include additional steps based on the desired user interface. The following discussion goes through various types of finger gestures, that may all be recognized and used such that the AR system automatically performs an action and/or presents virtual content to the user that is either derived from the cloud or retrieved locally.

Finger Gestures

Finger gestures can take a variety of forms and may, for example, be based on inter-finger interaction, pointing, tapping, rubbing, etc.

Other gestures may, for example, include 2D or 3D representations of characters (e.g., letters, digits, punctuation). To enter such, a user swipes their finger in the defined character pattern. In one implementation of a user interface, the AR system renders three circles, each circle with specifically chosen characters (e.g., letters, digits, punctuation) arranged circumferentially around the periphery. The user can swipe through the circles and letters to designate a character selection or input. In another implementation, the AR system renders a keyboard (e.g., QWERTY keyboard) low in the user's field of view, proximate a position of the user's dominate hand in a bent-arm position. The user can than perform a swipe-like motion through desired keys, and then indicate that the swipe gesture selection is complete by performing another gesture (e.g., thumb-to-ring finger gesture) or other proprioceptive interaction.

Other gestures may include thumb/wheel selection type gestures, which may, for example be used with a "popup" circular radial menu which may be rendered in a field of view of a user, according to one illustrated embodiment.

Figure 13:
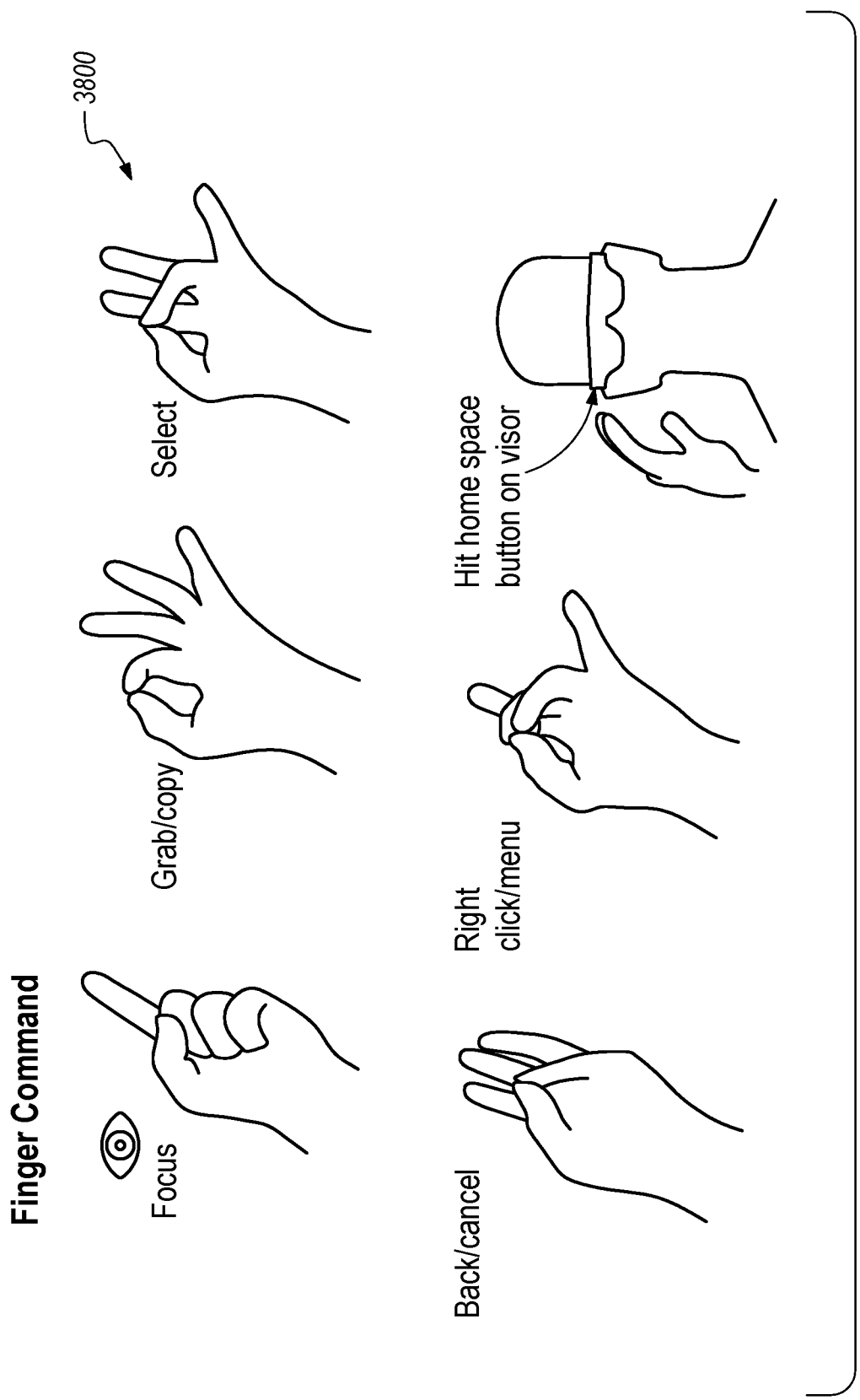
FIG. 13 is a plan view illustrating various finger gestures according to various embodiments.

Gestures 3800 of FIG. 13 shows a number of additional gestures. The AR system recognizes various commands, and in response performs certain functions mapped to the commands. The mapping of gestures to commands may be universally defined, across many users, facilitating development of various applications which employ at least some commonality in user interface. Alternatively or additionally, users or developers may define a mapping between at least some of the gestures and corresponding commands to be executed by the AR system in response to detection of the commands.

In the top row left-most position, a pointed index finger may indicate a command to focus, for example to focus on a particular portion of a scene or virtual content at which the index finger is pointed. In the top row middle position, a first pinch gesture with the tip of the index finger touching a tip of the thumb to form a closed circle may indicate a grab and/or copy command. In the top row right-most position, a second pinch gesture with the tip of the ring finger touching a tip of the thumb to form a closed circle may indicate a select command.

In the bottom row left-most position, a third pinch gesture with the tip of the pinkie finger touching a tip of the thumb to form a closed circle may indicate a back and/or cancel command. In the bottom row middle position, a gesture in which the ring and middle fingers are curled with the tip of the ring finger touching a tip of the thumb may indicate a click (e.g., right click) and/or menu command. In the bottom row right-most position, touching the tip of the index finger to a location on the head worn component or frame may indicate a return to home command. Such may cause the AR system to return to a home or default configuration, for example displaying a home or default menu.

It should be appreciated that there may be many more types of user input not limited to the ones discussed above. For example, the system may measure neurological signals and use that as an input for the system. The system may have a sensor that tracks brain signals and map it against a table of commands. In other words, the user input is simply the user's thoughts, that may be measured by the user's brain signals. This may also be referred to as subvocalization sensing. Such a system may also include apparatus for sensing EEG data to translate the user's "thoughts" into brain signals that may be decipherable by the system.

Hand Centroid Gesture Recognition Systems and Methods

"L"-Shaped Gesture

Figure 14:
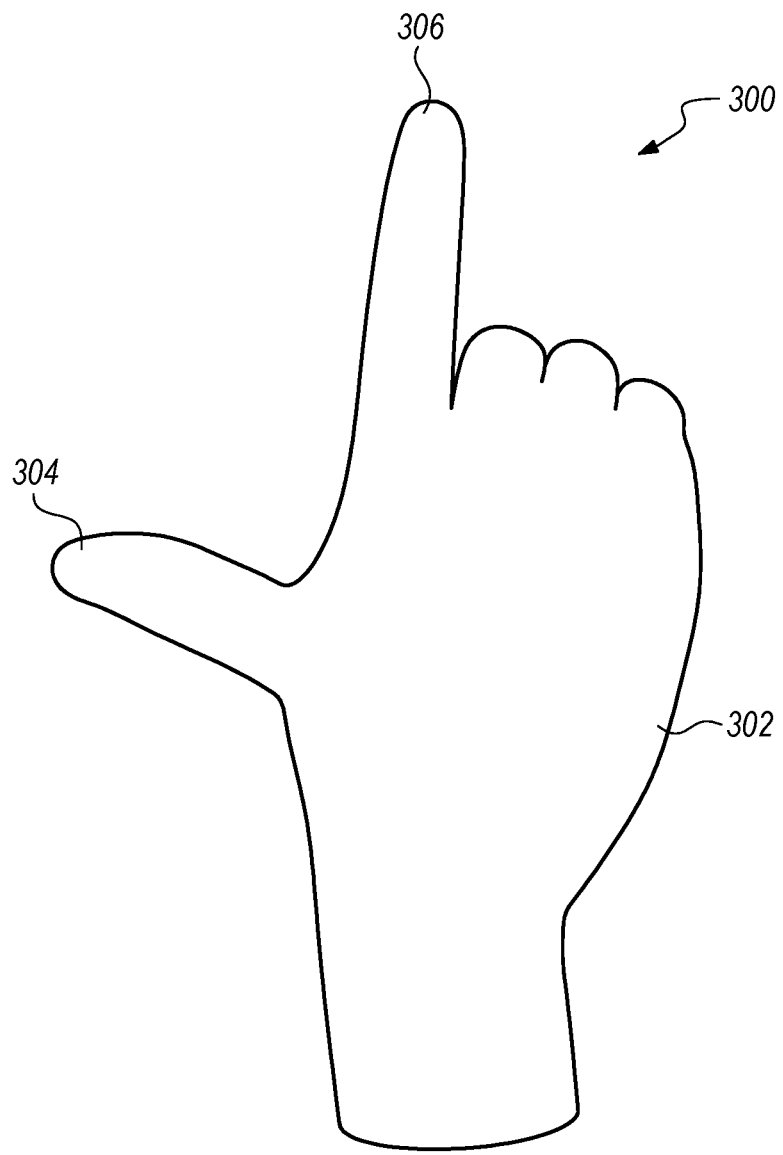
FIGS. 14-20 are a series of plan views illustrating steps in a method of recognizing a gesture and performing an action based on the recognized gesture according to one embodiment.

FIGS. 14-20 depict a hand centroid gesture recognition system according to one embodiment. FIG. 14 depicts an image 300 of a user's right hand 302. This image may have been acquired using a front facing FOV camera 208. The user's hand 302 is making an "L"-shaped gesture by positioning a thumb 304 and a first finger 306 at an almost right angle to each other.

In one embodiment, the object recognizer 222 in the gesture recognition subsystem 220 identifies the hand 302 in the image. The object recognizer 222 receives the image data from the front facing FOV camera 208 and/or the RAM 226. The object recognizer 222 may identify the hand 302 as a hand using the methods described above. Data relating to the identification of the hand 302 is stored in the RAM 226.

Figure 15:
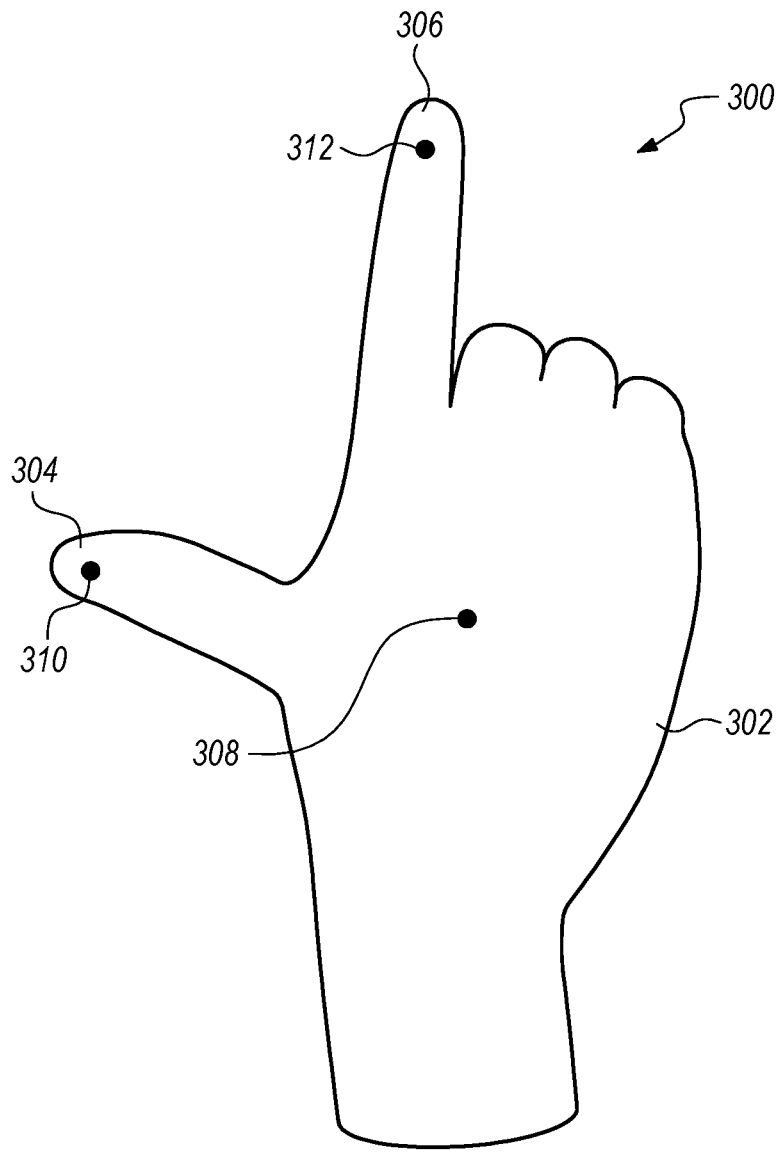

FIG. 15 depicts map points 308, 310, 312 identified in the image 300 of the hand 302. These map points correspond to a hand centroid 308, a thumb tip 310, and a first fingertip 312. In some embodiments, fewer or more map points may be identified. For example, one, two, eight, seventeen, or more points may be identified. In some embodiments, one or more images of the hand may be used to determine a 3D representation of the hand 302.

In one embodiment, the object recognizer 222 and/or the geometric analyzer 224 in the gesture recognition subsystem 220 identifies the map points correspond to the hand centroid 308, the thumb tip 310, and the first fingertip 312 in the image. The object recognizer 222 and/or the geometric analyzer 224 receives the image data from the front facing FOV camera 208 and/or the RAM 226. The object recognizer 222 and/or the geometric analyzer 224 may identify the map points 308, 310, 312 using the methods described above and/or geometric analysis methods. Data relating to the map points 308, 310, 312 in the image 300 of the hand 302 is stored in the RAM 226.

Figure 16:
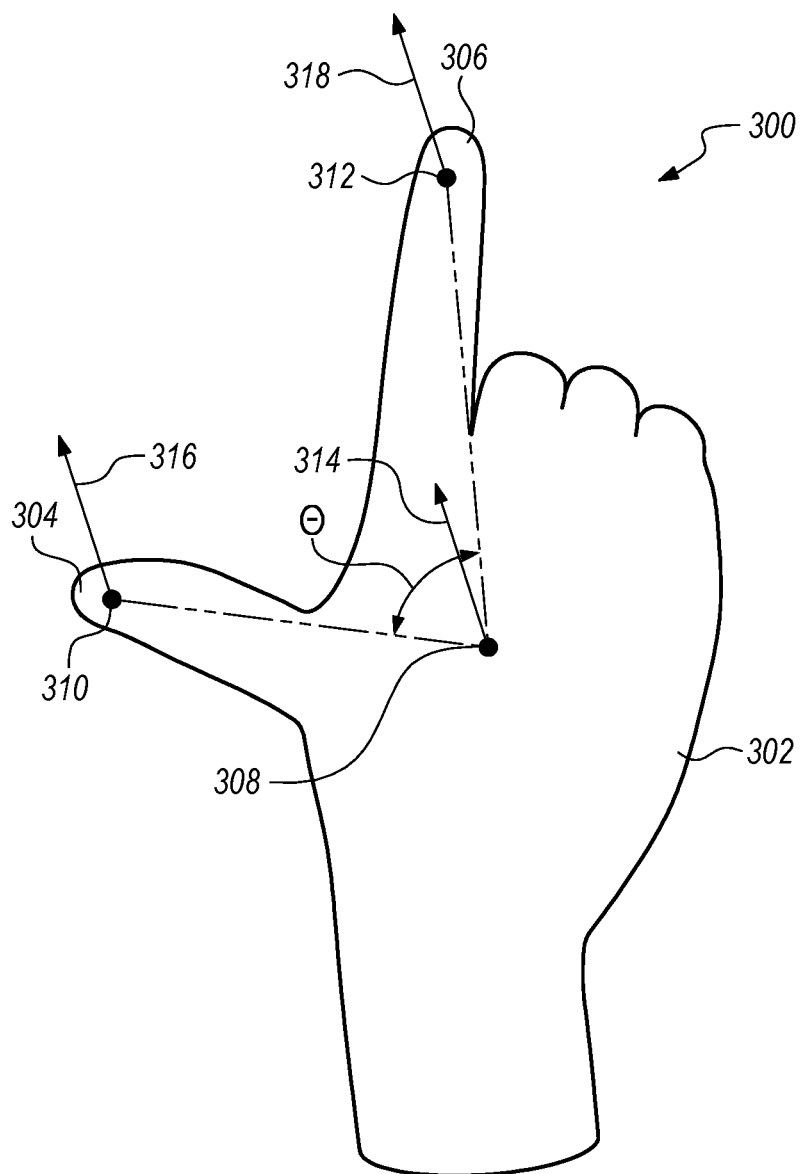

FIG. 16 depicts surface normals 314, 316, 318 at the map points 308, 310, 312 identified in the image 300 of the hand 302. The surface normal 314 at the hand centroid map point 308 is on a caudal surface of the hand 302. The surface normals 316, 318 at the thumb tip and first fingertip map points 310, 312 are on a surface defined by the extended thumb 304 and finger 306.

In one embodiment, the geometric analyzer 224 in the gesture recognition subsystem 220 identifies the surface normals 314, 316, 318 at the map points 308, 310, 312 in the image. The geometric analyzer 224 receives the image and map point data from the front facing FOV camera 208 and/or the RAM 226. The geometric analyzer 224 may identify the surface normals 314, 316, 318 using geometric analysis methods. Data relating to the surface normals 314, 316, 318 in the image 300 of the hand 302 is stored in the RAM 226.

Figure 17:
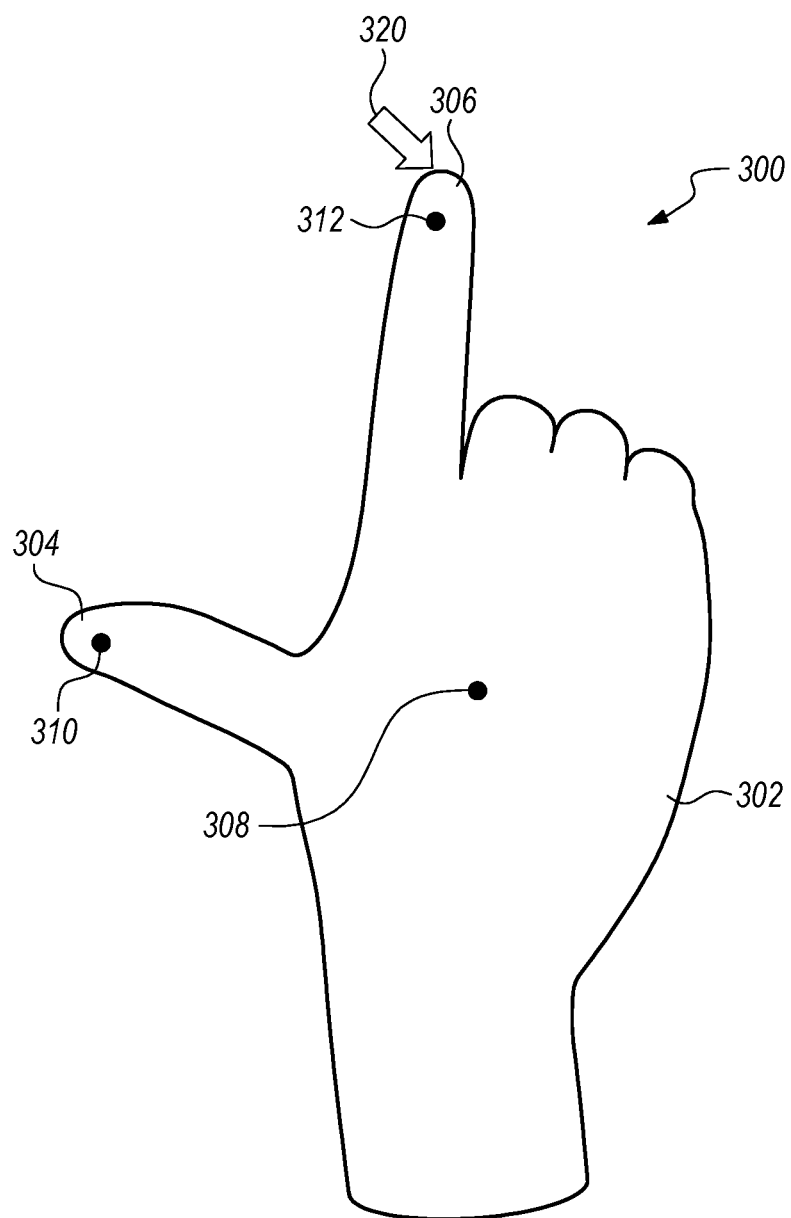

Because these three surface normals 314, 316, 318 are substantially parallel (e.g., within 10 degrees of each other), the gesture recognition subsystem 220 recognizes the gesture as an "L"-shape. In some embodiments, the gesture recognition subsystem 220, for "L"-shape gestures, determines an angle θ between map points 312, 308, and 310. In some embodiments, determining that θ is approximately 90 degrees is part of the gesture recognition subsystem 220 recognizing the gesture as an "L"-shape. In response to recognizing the "L"-shape gesture, the augmented reality system 200 displays a cursor 320 at a location adjacent the first fingertip map point 312, as shown in FIG. 17. The augmented reality system 200 may "stick" the cursor 320 to the first fingertip map point 312 to maintain the spatial relationship there between even when the first finger 306 moves. In some embodiments, the AR system 200 may project the cursor 320 into the environment based on a relationship of the map points 320, 308, and/or 310, for example, using ray casting.

In one embodiment, the geometric analyzer 224 in the gesture recognition subsystem 220 analyzes the surface normals 314, 316, 318 at the map points 308, 310, 312 in the image to determine whether they are substantially parallel. The geometric analyzer 224 receives the image and map point data from the front facing FOV camera 208 and/or the RAM 226. The geometric analyzer 224 may determine whether the surface normals 314, 316, 318 are substantially parallel using geometric analysis methods. Data relating geometric relationship between the surface normals 314, 316, 318 in the image 300 of the hand 302 and the identified "L"-gesture is stored in the RAM 226.

Figure 18:
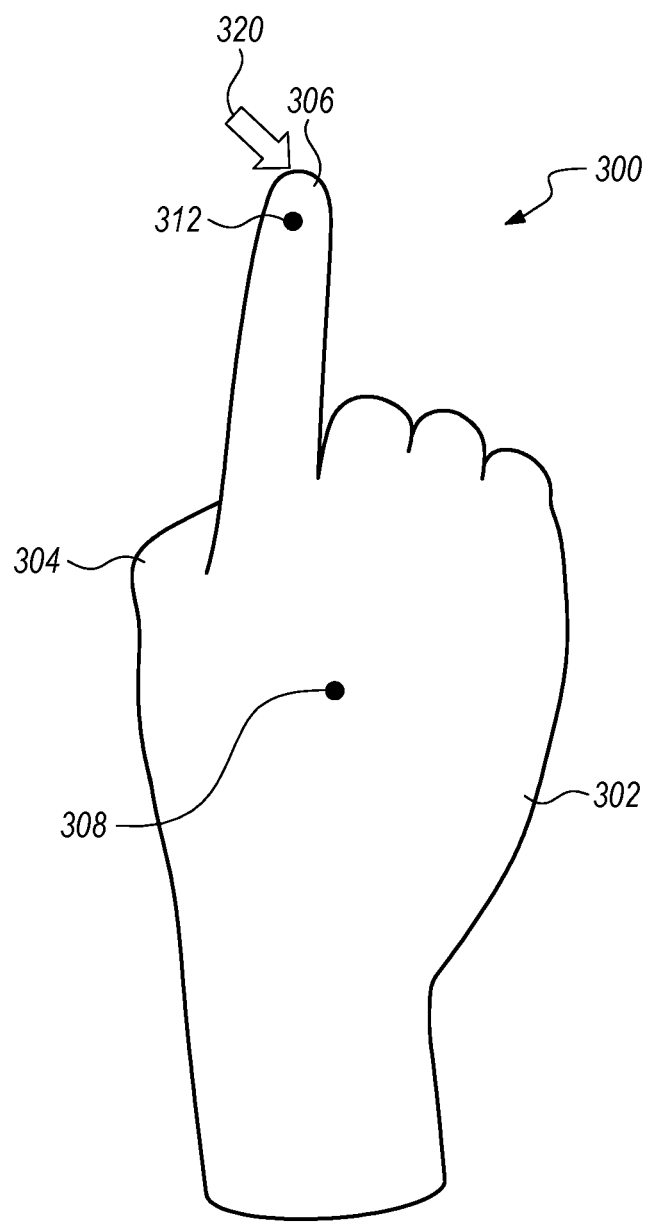
Figure 19:
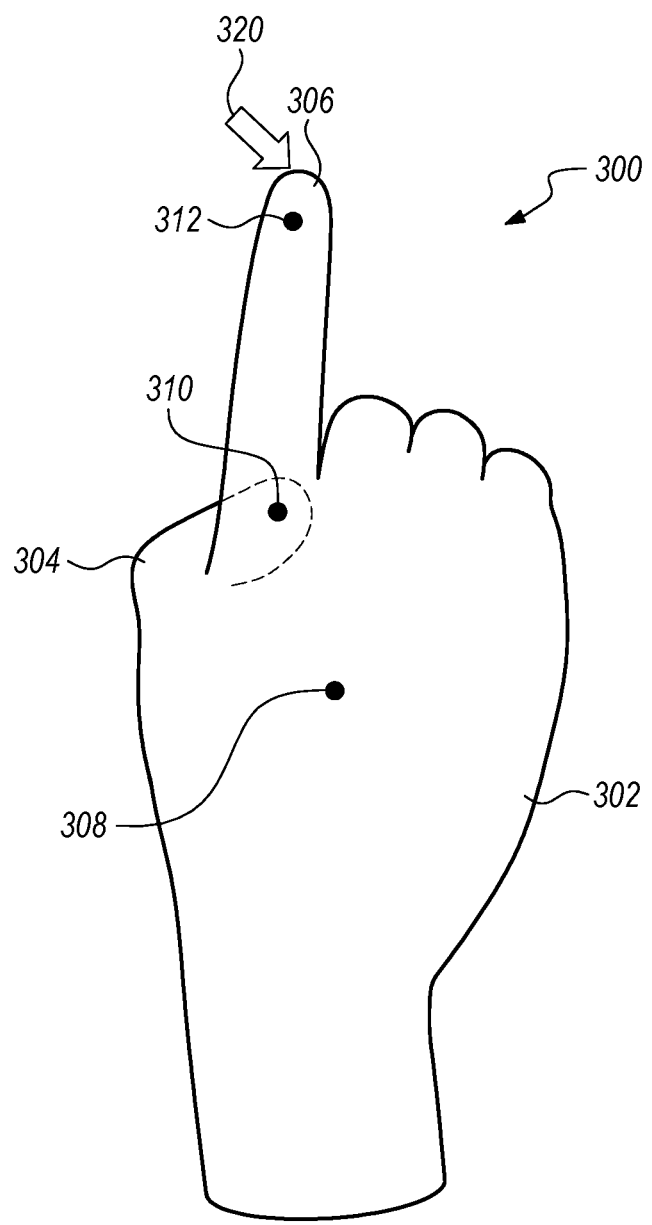
Figure 20:
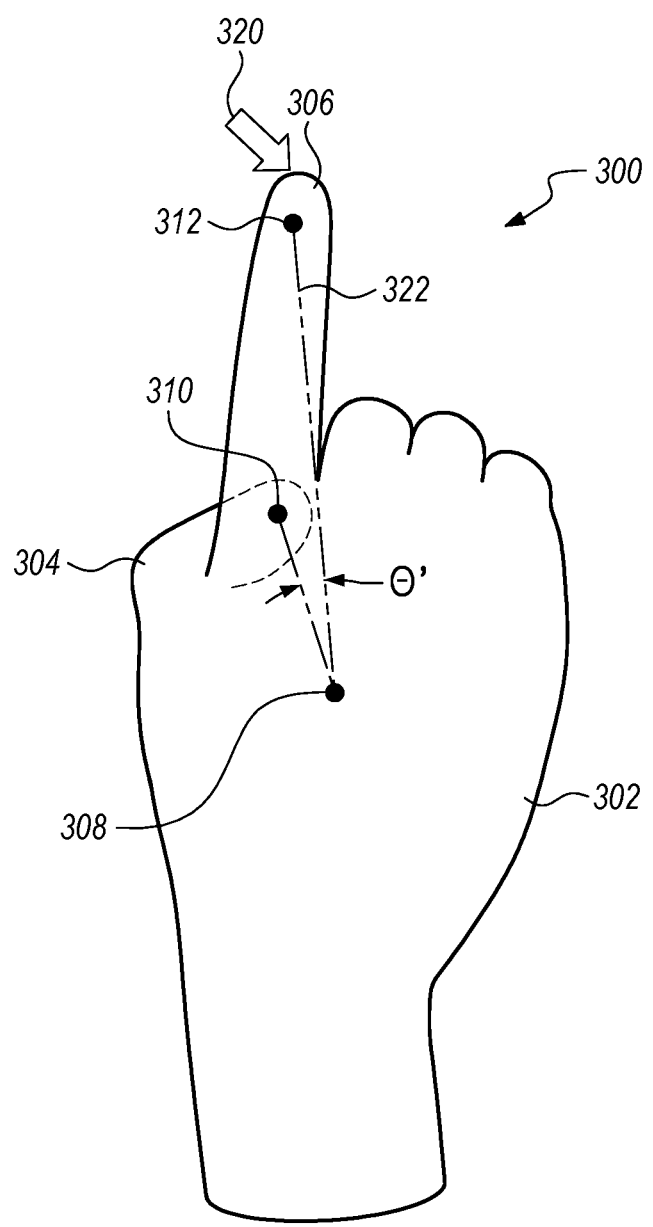

FIGS. 18-20 depict a click command executed by a hand 302 displaying the "L"-gesture. FIG. 18 shows that the tip of the user's thumb 304 has moved behind the user's hand 302. FIG. 19 depicts in shadow a position of the tip of the user's thumb 304, including the map point 310 at the thumb tip, as projected by the gesture recognition subsystem 220. FIG. 20 depicts a line 322 calculated by the gesture recognition subsystem 220 between the map points 312 and 308, from the first fingertip to the hand centroid. As the thumb tip 304 approaches line 322 to become occluded by the hand at map point 310, δ decreases in value. At a threshold limit of a change in the value of δ (from δ in FIGS. 16 to δ' in FIG. 20), in some embodiments less than about 30 degrees, the gesture recognition subsystem 220 identifies a click command executed by the hand 302 displaying the "L"-gesture. In identifying a threshold change in the value of δ, the gesture recognition subsystem 220 determines that the thumb tip 304 approaches line 322. In response to identification of the click command, the augmented reality system 200 executes a command (e.g., select, activate, close, etc.) at the location of the cursor 320.

In one embodiment, the object recognizer 222 and/or the geometric analyzer 224 in the gesture recognition subsystem 220 identifies the movement of the user's thumb 304 towards the position of map point 310 in FIGS. 19 and 20, projects the tip of the thumb 304, and analyzes the various map point 308, 310, 312 positions, all of which correspond to identification of the click command. The object recognizer 222 and/or the geometric analyzer 224 receives the image data from the front facing FOV camera 208 and/or the RAM 226. The object recognizer 222 and/or the geometric analyzer 224 may identify, project, and analyze using the methods described above and/or geometric analysis methods. Data relating to identification of the click command is stored in the RAM 226.

"C"-Shaped Gesture

Figure 21:
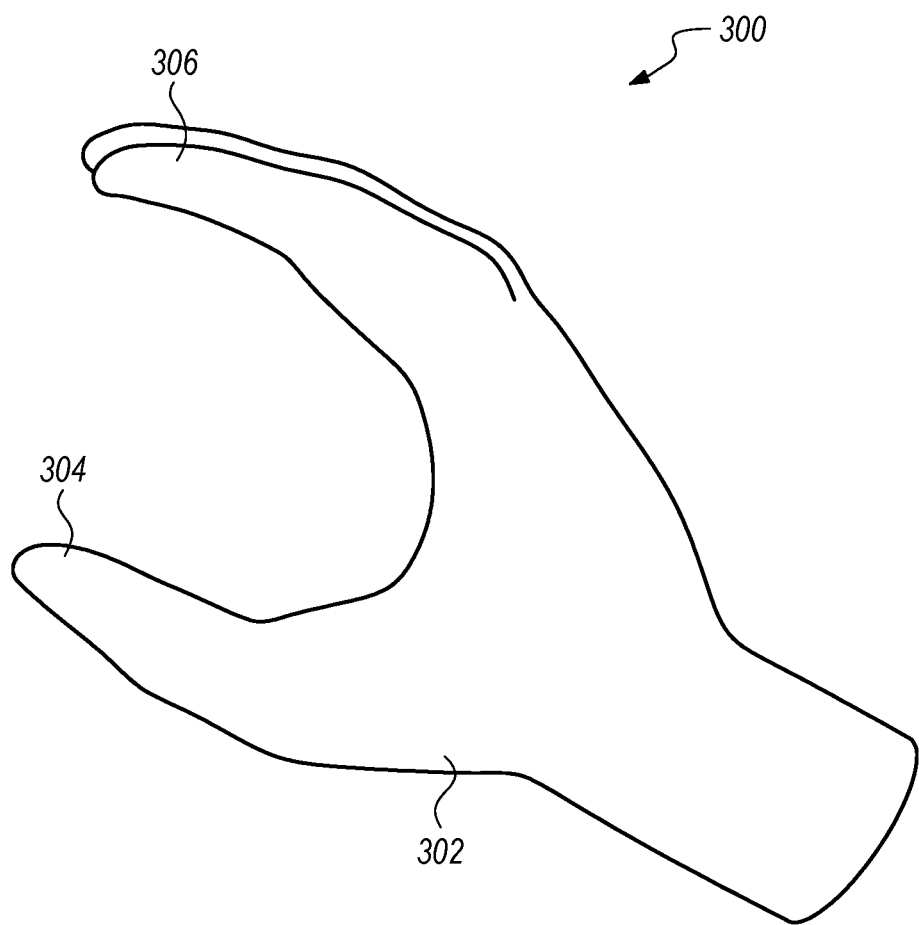
FIGS. 21-26 are a series of plan views illustrating steps in a method of recognizing a gesture and performing an action based on the recognized gesture according to another embodiment.

FIGS. 21-26 depict a hand centroid gesture recognition system according to another embodiment. FIG. 21 depicts an image 300 of a user's right hand 302. This image may have been acquired using a front facing FOV camera 208. The user's hand 302 is making a "C"-shaped gesture by selective positioning of a thumb 304 and a first finger 306 of the hand 302.

In one embodiment, the object recognizer 222 in the gesture recognition subsystem 220 identifies the hand 302 in the image. The object recognizer 222 receives the image data from the front facing FOV camera 208 and/or the RAM 226. The object recognizer 222 may identify the hand 302 as a hand using the methods described above. Data relating to the identification of the hand 302 is stored in the RAM 226.

Figure 22:
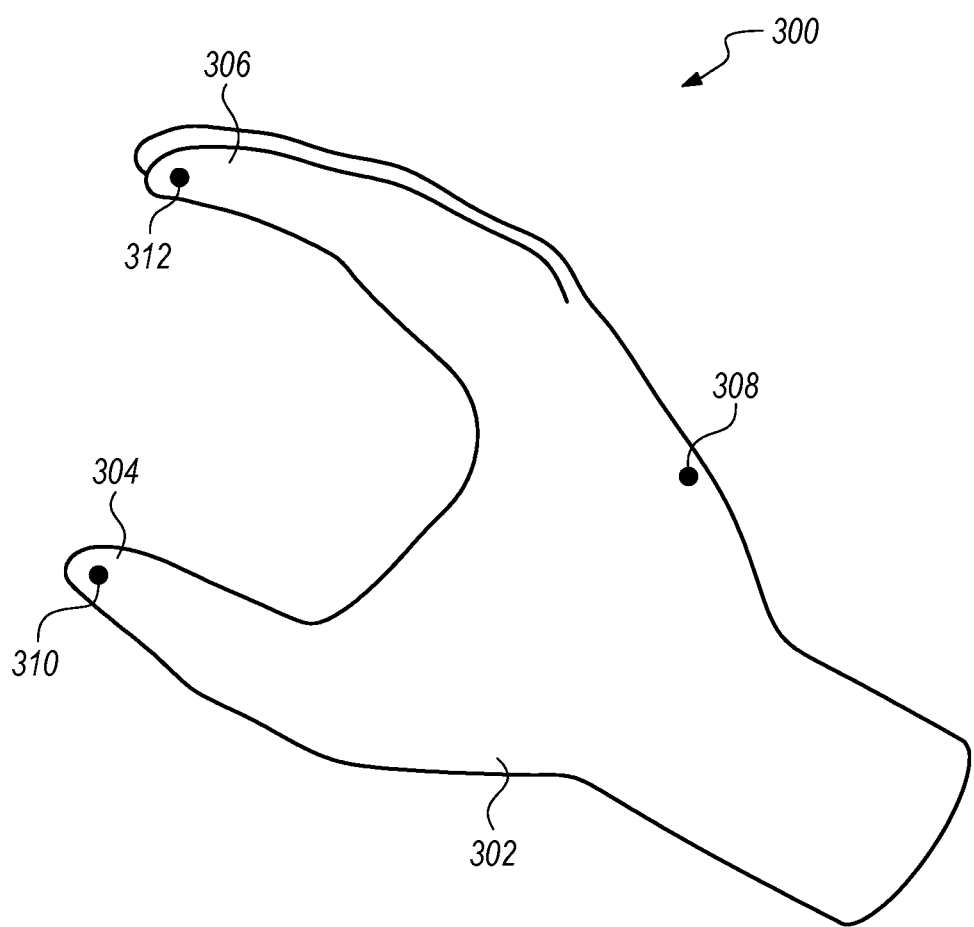

FIG. 22 depicts map points 308, 310, 312 identified in the image 300 of the hand 302. These map points correspond to a hand centroid 308, a thumb tip 310, and a first fingertip 312.

In one embodiment, the object recognizer 222 and/or the geometric analyzer 224 in the gesture recognition subsystem 220 identifies the map points correspond to the hand centroid 308, the thumb tip 310, and the first fingertip 312 in the image. The object recognizer 222 and/or the geometric analyzer 224 receives the image data from the front facing FOV camera 208 and/or the RAM 226. The object recognizer 222 and/or the geometric analyzer 224 may identify the map points 308, 310, 312 using the methods described above and/or geometric analysis methods. Data relating to the map points 308, 310, 312 in the image 300 of the hand 302 is stored in the RAM 226. In some embodiments, fewer or more map points may be identified. For example, one, two, eight, seventeen, or more points may be identified. In some embodiments, one or more images of the hand may be used to determine a 3D representation of the hand 302.

Figure 23:
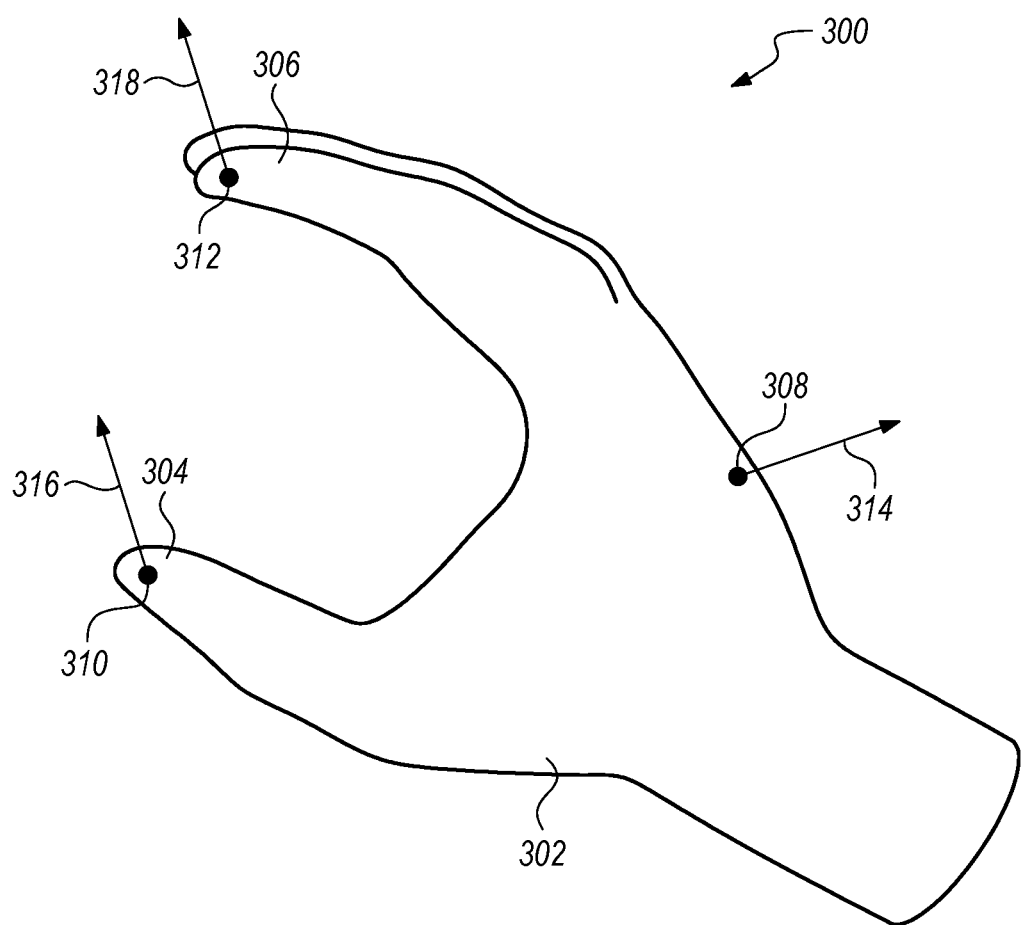

FIG. 23 depicts surface normals 314, 316, 318 at the map points 308, 310, 312 identified in the image 300 of the hand 302. The surface normal 314 at the hand centroid map point 308 is on a caudal surface of the hand 302. The surface normals 316, 318 at the thumb tip and first fingertip map points 310, 312 are on a surface defined by the thumb 304 and finger 306.

In one embodiment, the geometric analyzer 224 in the gesture recognition subsystem 220 identifies the surface normals 314, 316, 318 at the map points 308, 310, 312 in the image. The geometric analyzer 224 receives the image and map point data from the front facing FOV camera 208 and/or the RAM 226. The geometric analyzer 224 may identify the surface normals 314, 316, 318 using geometric analysis methods. Data relating to the surface normals 314, 316, 318 in the image 300 of the hand 302 is stored in the RAM 226.

Figure 24:
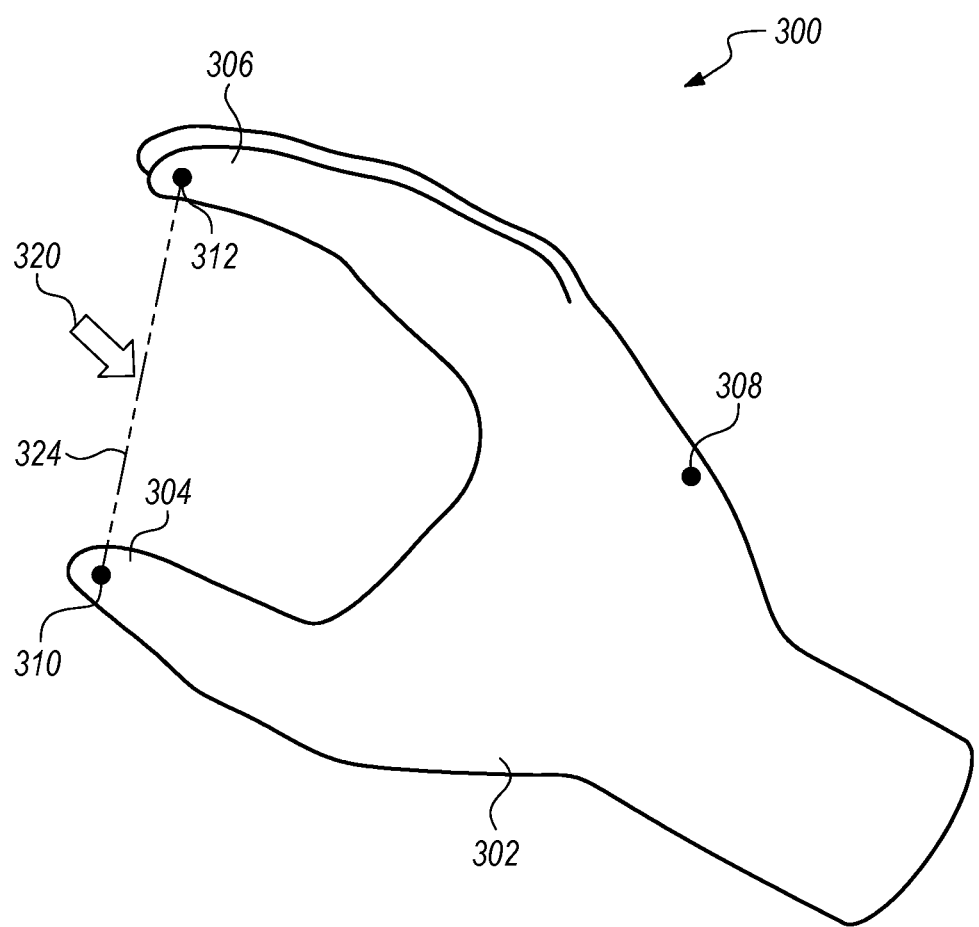

Because the surface normal at the hand centroid map point 308 is substantially orthogonal (e.g., within 10 degrees of perpendicular) to the respective surface normals 316, 318 at the thumb tip and first fingertip map points 310, 312, the gesture recognition subsystem 220 recognizes the gesture as an "C"-shape. In response to recognizing the "C"-shape gesture, the augmented reality system 200 displays a cursor 320 at a location (e.g., midway) adjacent a line 324 between the thumb tip and the first fingertip map points 310, 312, as shown in FIG. 24. The augmented reality system 200 may "stick" the cursor 320 to the location (e.g., midway) between the thumb tip and the first fingertip map points 310, 312 to maintain the spatial relationship there between even when the hand 302 moves.

In one embodiment, the geometric analyzer 224 in the gesture recognition subsystem 220 analyzes the surface normals 314, 316, 318 at the map points 308, 310, 312 in the image to determine whether they have the substantially orthogonal relationship described above. The geometric analyzer 224 receives the image and map point data from the front facing FOV camera 208 and/or the RAM 226. The geometric analyzer 224 may determine whether the surface normals 314, 316, 318 have the substantially orthogonal relationship using geometric analysis methods. Data relating geometric relationship between the surface normals 314, 316, 318 in the image 300 of the hand 302 and the identified "C"-gesture is stored in the RAM 226.

Figure 25:
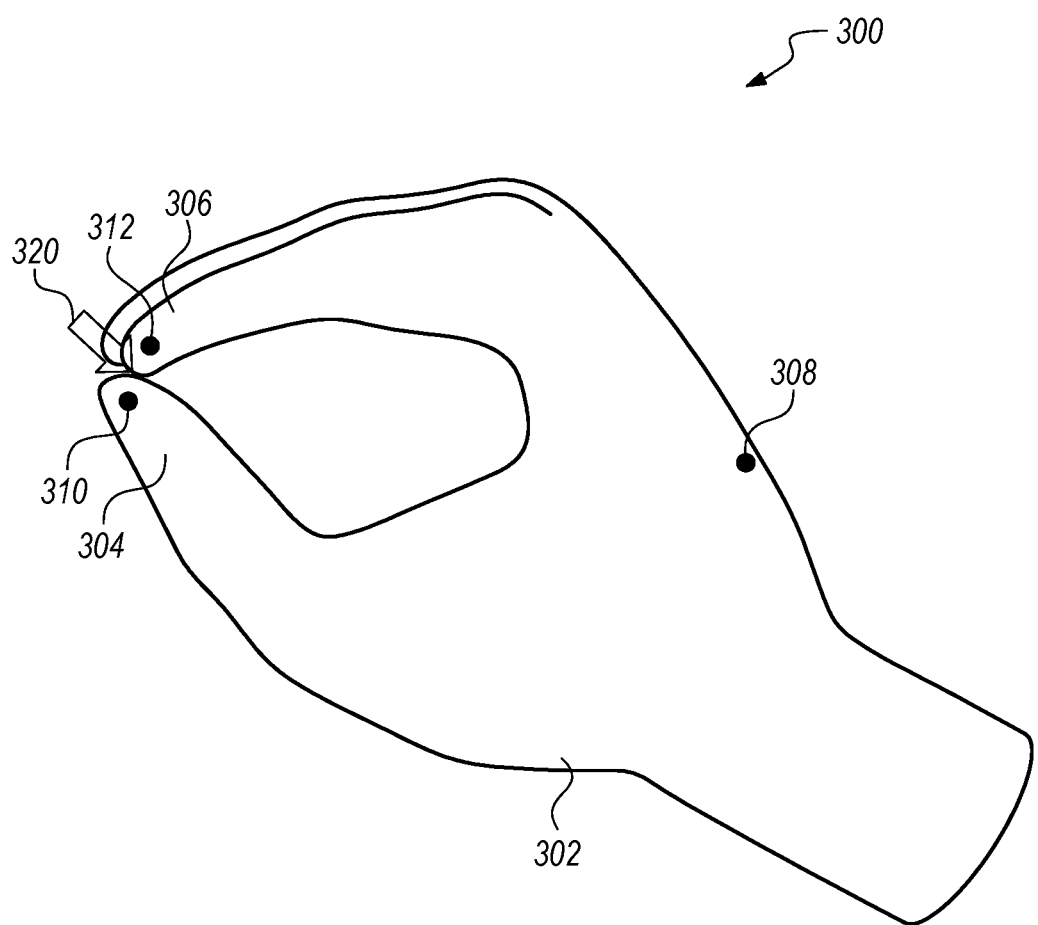
Figure 26:
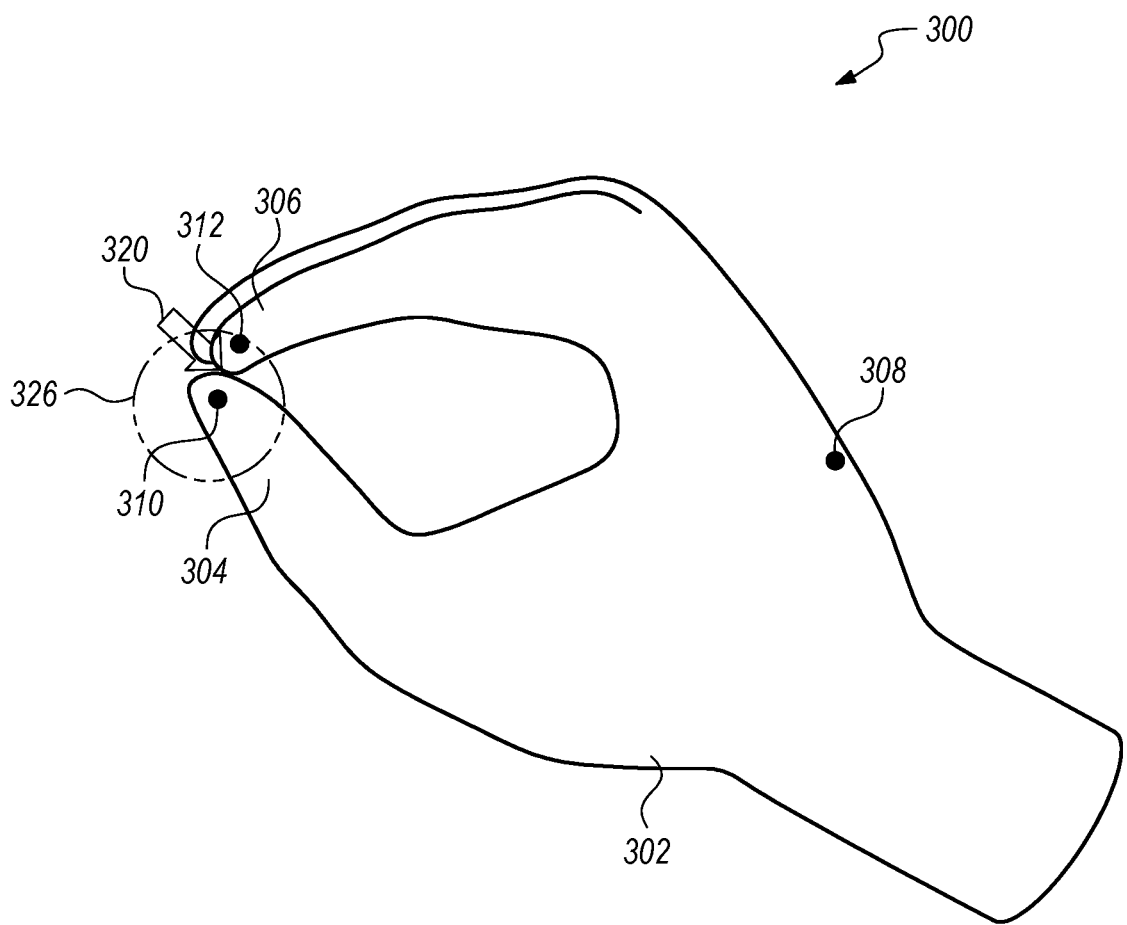

FIGS. 25-26 depict a click command executed by a hand 302 displaying the "C"-gesture. FIG. 25 shows that the tip of the user's thumb 304 and the tip of the user's first finger 306 have moved so that their positions are substantially similar. In one embodiment, the gesture recognition subsystem 220 may recognize that the positions are substantially similar when the first fingertip map point 312 is within a certain radius 326 of the thumb tip map point 310, as shown in FIG. 26. Because the respective positions of the tip of the user's thumb 304 and the tip of the user's first finger 306 are substantially similar, the gesture recognition subsystem 220 identifies a click command executed by the hand 302 displaying the "C"-gesture. In response to identification of the click command, the augmented reality system 200 executes a command (e.g., select, activate, close, etc.) at the location of the cursor 320.

In one embodiment, the object recognizer 222 and/or the geometric analyzer 224 in the gesture recognition subsystem 220 identifies the movement of the user's thumb 304 and/or first finger 306 and analyzes the map point 312, 314 positions corresponding to their respective tips, all of which correspond to identification of the click command. The object recognizer 222 and/or the geometric analyzer 224 receives the image data from the front facing FOV camera 208 and/or the RAM 226. The object recognizer 222 and/or the geometric analyzer 224 may identify and analyze using the methods described above and/or geometric analysis methods. Data relating to identification of the click command is stored in the RAM 226.

While the gesture recognition embodiments described herein include analyzing images from front facing FOV cameras 208, the FOV of the cameras 208 may be larger than the FOV of the user (i.e., of the user's eyes). Accordingly, the "L"-shaped and/or "C"-shaped gestures described above may be used tactilely outside of the user's FOV, but within the FOV of the front facing FOV cameras 208. In one such embodiment, the "L"-shaped and/or "C"-shaped gestures may be used on a surface (e.g., desktop, lap, etc.) to perform the functions of a virtual mouse.

System Architecture Overview

Figure 27:
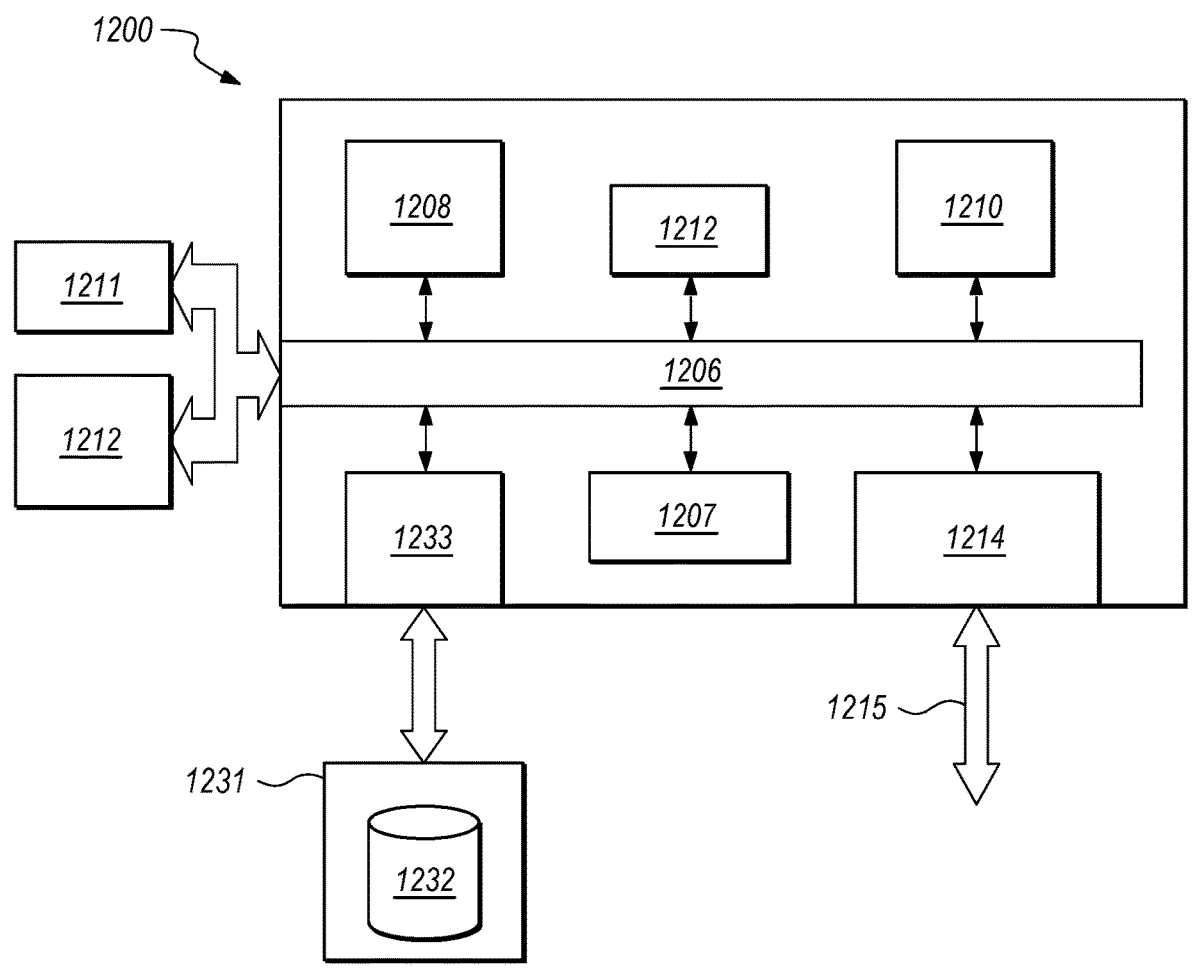
FIG. 27 is a block diagram schematically depicting an illustrative computing system suitable for implementing an embodiment of the present disclosure.

FIG. 27 is a block diagram of an illustrative computing system 1200 suitable for implementing an embodiment of the present invention. Computer system 1200 includes a bus 1206 or other communication mechanism for communicating information, which interconnects subsystems and devices, such as processor 1207, system memory 1208 (e.g., RAM), static storage device 1209 (e.g., ROM), disk drive 1210 (e.g., magnetic or optical), communication interface 1214 (e.g., modem or Ethernet card), display 1211 (e.g., CRT or LCD), input device 1212 (e.g., keyboard), and cursor control.

According to one embodiment of the invention, computer system 1200 performs specific operations by processor 1207 executing one or more sequences of one or more instructions contained in system memory 1208. Such instructions may be read into system memory 1208 from another computer readable/usable medium, such as static storage device 1209 or disk drive 1210. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1207 for execution. Such a medium may take many forms, including but not limited to, non-volatile media and volatile media. Non-volatile media includes, for example, optical or magnetic disks, such as disk drive 1210. Volatile media includes dynamic memory, such as system memory 1208.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM (e.g., NAND flash, NOR flash), any other memory chip or cartridge, or any other medium from which a computer can read.

In an embodiment of the invention, execution of the sequences of instructions to practice the invention is performed by a single computer system 1200. According to other embodiments of the invention, two or more computer systems 1200 coupled by communication link 1215 (e.g., LAN, PTSN, or wireless network) may perform the sequence of instructions required to practice the invention in coordination with one another.

Computer system 1200 may transmit and receive messages, data, and instructions, including program, i.e., application code, through communication link 1215 and communication interface 1214. Received program code may be executed by processor 1207 as it is received, and/or stored in disk drive 1210, or other non-volatile storage for later execution. Database 1232 in storage medium 1231 may be used to store data accessible by system 1200 via data interface 1233.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element-irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method of executing a gesture command, comprising:
identifying a point of a hand between a wrist and a base of fingers of the hand;
identifying a first finger tip of a first finger on the hand;
identifying a thumb tip of a thumb on the hand;
determining surface normals respectively at the point of the hand, the first finger tip, and the thumb tip;
computing angles between the respective surface normals;
determining that the respective surface normals at the point of the hand on a caudal surface of the hand, at the first finger tip, and at the thumb tip are substantially parallel based on the computed angles between the respective surface normal;
determining an L-shaped gesture of the hand based at least in part on determining that the respective surface normals at the point of the hand on a caudal surface of the hand, at the first finger tip, and at the thumb tip are substantially parallel;
displaying a cursor in a field of view at a location corresponding to the first finger tip in response to determining the L-shaped gesture; and
maintaining the cursor at the location corresponding to the first finger tip after the first finger moves.

2. The method of claim 1, further comprising:
determining an angle between the first finger tip, the point of the hand, and the thumb tip, and
determining the L-shaped gesture of the hand based at least in part on determining the angle is approximately 90 degrees.

3. The method of claim 1, further comprising:
detecting a movement of the thumb tip to a mapped planar position between the point of the hand and the first finger tip; and
executing a command at the cursor location in response to detecting the movement.

4. The method of claim 1, further comprising:
calculating a first line between the first finger tip and the point of the hand;
calculating a second line between the thumb tip and the point of the hand;
determining an angular relationship between the first and second lines; and
determining a gesture of the hand based on the determined angular relationship between the first and second lines.

5. The method of claim 4, further comprising:
determining that the first and second lines are substantially orthogonal based on the determined angular relationship between the first and second lines; and determining the L-shaped gesture of the hand based at least in part on determining the first and second lines are substantially orthogonal.

6. The method of claim 4, wherein a virtual cursor is displayed in a field of view at a location corresponding to the first finger tip.

7. The method of claim 6, further comprising:
detecting a change in the angular relationship between the first and second lines; and
executing a command at the cursor location in response to detecting the change in the angular relationship between the first and second lines.

8. The method of claim 7, wherein the change in the angular relationship between the first and second lines is a threshold amount of decrease in an angle between first and second lines.

9. The method of claim 8, wherein the threshold amount of decrease is about 30 degrees.

10. The method of claim 1, wherein the point of the hand is a hand centroid.

* * * * *